United States Patent
Ma

(10) Patent No.: US 11,098,700 B2
(45) Date of Patent: Aug. 24, 2021

(54) ENCLOSURE AND DYNAMIC HEAT DISSIPATION METHOD FOR HEAT SOURCE INSIDE THE ENCLOSURE AND DYNAMIC HEAT DISSIPATION SYSTEM INSIDE THE ENCLOSURE

(71) Applicant: BEIJING GOLDWIND SCIENCE & CREATION WINDPOWER EQUIPMENT CO., LTD., Beijing (CN)

(72) Inventor: Shengjun Ma, Beijing (CN)

(73) Assignee: Beijing Goldwind Science & Creation Windpower Equipment Co., Ltd., Beijing (CN)

(*) Notice: Subject to any disclaimer, the term of this patent is extended or adjusted under 35 U.S.C. 154(b) by 671 days.

(21) Appl. No.: 16/067,716

(22) PCT Filed: Sep. 18, 2017

(86) PCT No.: PCT/CN2017/102036
§ 371 (c)(1),
(2) Date: Jul. 2, 2018

(87) PCT Pub. No.: WO2018/120922
PCT Pub. Date: Jul. 5, 2018

(65) Prior Publication Data
US 2021/0079897 A1    Mar. 18, 2021

(30) Foreign Application Priority Data
Dec. 29, 2016 (CN) .......................... 201611247515.7

(51) Int. Cl.
*F03D 80/60* (2016.01)
*F03D 13/20* (2016.01)
(Continued)

(52) U.S. Cl.
CPC ............. *F03D 80/60* (2016.05); *F03D 13/20* (2016.05); *F03D 80/80* (2016.05); *F03D 80/82* (2016.05);
(Continued)

(58) Field of Classification Search
CPC .......... F03D 13/20; F03D 80/00; F03D 80/60; F03D 80/80; F03D 80/82; F03D 80/85;
(Continued)

(56) References Cited

U.S. PATENT DOCUMENTS 2,555,254 A * 5/1951 Stebbins ................ A47B 46/00
312/319.7
3,415,586 A * 12/1968 Hammond ............. A47B 51/00
312/312

(Continued)

FOREIGN PATENT DOCUMENTS

CN    101493282 A    7/2009
CN    102365719 A    2/2012
(Continued)

OTHER PUBLICATIONS

Extended European Search Report issued by European Patent Office for counterpart European Application No. 17879655.3, dated Jul. 16, 2019.
(Continued)

*Primary Examiner* — Pedro J Cuevas
(74) *Attorney, Agent, or Firm* — Finnegan, Henderson, Farabow, Garrett & Dunner LLP

(57) ABSTRACT

An enclosure and a dynamic heat dissipation method for a heat source inside the enclosure and a dynamic heat dissipation system are provided. The dynamic heat dissipation method includes: acquiring a relatively low temperature area of the enclosure; and driving the heat source to move to the relatively low temperature area. A heat source, which is (Continued)

conventionally at a relatively fixed position, is artificially and actively transformed into a mobile heat source, so as to allow the heat source to be self-adapted to the temperature field; a relatively low temperature area inside the enclosure is searched, taking advantage of the characteristics of temperature differences, the position of the heat source is adjusted and the heat dissipation layout is adjusted, thereby providing the heat source with an optimal heat transfer direction from inside to outside and an enclosure environment where the heat is dissipated at a maximum rate.

29 Claims, 24 Drawing Sheets

(51) Int. Cl.
    *F03D 80/80*     (2016.01)
    *F03D 80/00*     (2016.01)

(52) U.S. Cl.
    CPC .............. *F03D 80/00* (2016.05); *F03D 80/85* (2016.05); *F03D 80/88* (2016.05); *F05B 2240/21* (2013.01); *F05B 2240/923* (2013.01); *F05B 2260/20* (2013.01); *F05B 2260/221* (2013.01); *Y02E 10/72* (2013.01)

(58) Field of Classification Search
    CPC ................. F03D 80/88; F05B 2240/21; F05B 2240/923; F05B 2260/20; F05B 2260/221; Y02E 10/72; Y02E 10/728; H02G 3/03
    See application file for complete search history.

(56) References Cited

U.S. PATENT DOCUMENTS

| | | | | |
|---|---|---|---|---|
| 3,595,216 | A * | 7/1971 | Lanciault | F24S 10/73 126/606 |
| 3,823,703 | A * | 7/1974 | Lanciault | F24S 10/73 126/588 |
| 3,973,553 | A * | 8/1976 | Lanciault | B60P 3/343 126/634 |
| 4,356,812 | A * | 11/1982 | Haven | F24S 23/74 126/572 |
| 5,535,852 | A * | 7/1996 | Bishop | B66B 9/00 187/336 |
| 5,667,035 | A * | 9/1997 | Hughes | B66F 7/02 182/142 |
| 5,671,824 | A * | 9/1997 | Keegan | A62B 1/02 182/82 |
| 6,755,492 | B1 * | 6/2004 | Hyde | A47B 51/00 312/247 |
| 6,775,137 | B2 * | 8/2004 | Chu | H05K 7/20754 165/120 |
| 6,924,981 | B2 * | 8/2005 | Chu | H05K 7/20754 165/104.33 |
| 7,246,865 | B1 * | 7/2007 | Merrell, II | A47B 46/005 312/248 |
| 7,888,590 | B2 * | 2/2011 | Niederer | F03D 9/25 136/251 |
| 9,163,857 | B2 * | 10/2015 | Plotkin | F24S 10/742 |
| 9,271,571 | B2 * | 3/2016 | DeLorean | E04B 9/02 |
| 9,383,122 | B2 * | 7/2016 | Saucedo | F24S 23/74 |
| 9,429,138 | B2 * | 8/2016 | Matulewicz | B66C 23/207 |
| 9,935,434 | B2 | 4/2018 | Soerensen | |
| 10,914,538 | B2 * | 2/2021 | Ma | F24S 80/56 |
| 2004/0100770 | A1 * | 5/2004 | Chu | H05K 7/20754 361/698 |
| 2004/0190247 | A1 * | 9/2004 | Chu | H05K 7/20754 361/696 |
| 2006/0066188 | A1 * | 3/2006 | Crawford | E04B 9/003 312/247 |
| 2010/0192600 | A1 | 8/2010 | Schenk et al. | |
| 2010/0193154 | A1 | 8/2010 | Aderhold et al. | |
| 2013/0214538 | A1 | 8/2013 | Himmelmann | |
| 2014/0252930 | A1 * | 9/2014 | Reid | A47B 51/00 312/247 |
| 2014/0354126 | A1 * | 12/2014 | DeLorean | F24F 13/20 312/236 |
| 2015/0044011 | A1 * | 2/2015 | Matulewicz | B66D 1/60 414/800 |
| 2015/0128929 | A1 * | 5/2015 | Saucedo | F24S 23/70 126/601 |
| 2015/0216298 | A1 * | 8/2015 | DeLorean | F24F 13/20 312/236 |
| 2017/0077687 | A1 | 3/2017 | Soerensen | |
| 2018/0306532 | A1 * | 10/2018 | Ma | F03D 80/60 |
| 2019/0316568 | A1 * | 10/2019 | Nielsen | F03D 80/50 |

FOREIGN PATENT DOCUMENTS

| | | |
|---|---|---|
| CN | 105089941 A | 11/2015 |
| CN | 105098670 A | 11/2015 |
| CN | 105736259 A | 7/2016 |
| CN | 106602482 A | 4/2017 |
| CN | 106655025 A | 5/2017 |
| DE | 102014206000 A1 | 10/2015 |
| EP | 1921311 A1 | 5/2008 |
| EP | 2224130 A2 | 9/2010 |
| EP | 3 258 559 A1 | 12/2017 |
| KR | 10-1225690 B1 | 1/2013 |

OTHER PUBLICATIONS

2nd Office Action issued in corresponding Chinese Application No. 201611247515.7, dated Jul. 9, 2018.

International Search Report issued in International Application No. PCT/CN2017/102036, mailed from the State Intellectual Property Office of the People's Republic of China dated Dec. 5, 2017.

* cited by examiner

ENCLOSURE AND DYNAMIC HEAT DISSIPATION METHOD FOR HEAT SOURCE INSIDE THE ENCLOSURE AND DYNAMIC HEAT DISSIPATION SYSTEM INSIDE THE ENCLOSURE

CROSS-REFERENCE TO RELATED APPLICATIONS

This application is the national phase of International Application No. PCT/CN2017/102036, titled "ENCLOSURE AND DYNAMIC HEAT DISSIPATION METHOD FOR HEAT SOURCE INSIDE THE ENCLOSURE AND DYNAMIC HEAT DISSIPATION SYSTEM INSIDE THE ENCLOSURE", filed on Sep. 18, 2017, which claims the benefit of priority to Chinese Patent Application No. 201611247515.7, titled "ENCLOSURE AND DYNAMIC HEAT DISSIPATION METHOD FOR HEAT SOURCE INSIDE THE ENCLOSURE AND DYNAMIC HEAT DISSIPATION SYSTEM INSIDE THE ENCLOSURE", filed on Dec. 29, 2016 with the Chinese State Intellectual Property Office, the entire disclosures of all of which applications are incorporated herein by reference

FIELD

The present application relates to the technical field of heat dissipation, and specifically to an enclosure and a dynamic heat dissipation method for a heat source inside the enclosure and a dynamic heat dissipation system inside the enclosure.

BACKGROUND

Reference is made to FIG. 1-1, which is a schematic view showing the structure of a tower in the conventional technology, showing cables inside the tower.

It may be seen from the above figure that, lots of cables are laid inside the tower, and the power transmission cables 30 from a switch cabinet of a generator pass through a base platform via a bottom of a nacelle into a reference plane at the top of the tower. The nacelle 20 and the interior thereof yaw integrally, which causes the cables 300 to twist to-and-fro. Therefore, a carrying bracket is arranged inside the tower, and the cables below the carrying bracket, parts of which in groups, hang down near a tower wall 10 and are fixed, and are integrally in a substantially vertical state.

Continuing to refer to FIG. 1-2 and FIG. 1-3, FIG. 1-2 is a schematic view of the composition of a sol-air temperature outside the tower in summer in the conventional technology, and FIG. 1-3 shows the sol-air temperatures of the tower in different orientations in the conventional technology. FIG. 1-2 and FIG. 1-3 are both obtained by taking a practical tower within the territory of China in the northern hemisphere as a monitoring object.

In FIG. 1-2, the sol-air temperature of the tower is formed by the combined effect of solar radiation and outdoor air temperature, that is, curve 1 (indicating the sol-air temperature outside the tower) is formed by superposing curve 2 (indicating the temperature of air outside the tower) on curve 3 (indicating an equivalent temperature of solar radiation).

In FIG. 1-3, curve 1 indicates the sol-air temperature of the tower in a horizontal direction (i.e., the temperature of the the top of the tower), curve 2 indicates a sol-air temperature of an east vertical side of the tower, and curve 3 indicates a sol-air temperature of a west vertical side of the tower.

It is reflected by the above FIG. 1-3 that:

1. The sol-air temperature of the top of the nacelle is constantly higher than the temperatures of the east vertical side and the west vertical side of the enclosure outside the tower and the nacelle 20 from 8 o'clock to 14 o'clock, and by taking 12 o'clock as a symmetry point, an outer surface of the top of the nacelle 20 is continuously in an environment with a high sol-air temperature.

2. For the enclosure outside the tower and the nacelle 20, the temperature of the west vertical side is higher than the temperature of the east vertical side 8 hours later.

3. After the west vertical side reaches the maximum temperature at 16 o'clock, considering that transferring of a temperature wave to the tower takes time, an inner surface of the nacelle 20 may reach the maximum temperature after delaying for about half an hour. The delay time is related to materials of the tower and the nacelle and a heat storage coefficient of a coating material thereof, and the magnitude of the heat storage coefficient corresponds to the delay time of the high temperature inside the enclosure. In summer of Hami Prefecture at the southern slope of Mt. Tianshan in Xinjiang, the geographical position determines that wind often blows after 18 o'clock, resulting in that the wind turbine generator system keeps generating power at full power till the next daybreak. This means that the heat generated by the heat sources inside the wind turbine generator system continues to increase, and the falling of the external environment temperature does not immediately affect the temperature of the internal environment of the generator system.

In other words, the inside of the tower is always in a high-temperature state, especially in summer, and in this case, the power transmission cables 30 can hardly dissipate heat due to the excessively high internal temperature, and the temperature of the power transmission cables 30 may even become higher, which adversely affects the service life of the power transmission cables and the safety of the entire power transmission system.

SUMMARY

In order to address the above technical issues, an enclosure and a dynamic heat dissipation method for a heat source inside the enclosure and a dynamic heat dissipation system inside the enclosure are provided according to the present application. The dynamic heat dissipation system and the dynamic heat dissipation method help to dissipate the heat of the heat source more efficiently.

The dynamic heat dissipation method for the heat source inside the enclosure according to the present application includes:

acquiring a relatively low temperature area of the enclosure; and driving the heat source to move to the relatively low temperature area.

Preferably, the step of acquiring the relatively low temperature area includes:

acquiring a position of surrounding flow separation around an outer surface of the enclosure in contact with an upward incoming flow according to parameters of airflow outside the enclosure, and taking the position as the relatively low temperature area; or acquiring the relatively low temperature area according to a position of the shady side of the enclosure corresponding to an irradiation direction of solar radiation; or selecting a position between a position of surrounding flow separation at the shady side of the outer surface of the enclosure and the position of the shady side of the enclosure corresponding to the irradiation direction of the solar radiation as the relatively low temperature area.

Preferably, the position of the shady side of the enclosure corresponding to the irradiation direction of the solar radiation is a position of the shady side right corresponding to the irradiation direction of the solar radiation.

Preferably, the position of the shady side corresponding to the irradiation direction of the solar radiation is an position which is deflected by a predetermined angle toward a sunset direction with respect to a position of the shady side right corresponding to the irradiation direction of the solar radiation.

Preferably, a temperature of an inner wall and a temperature of an outer wall at a sunlit side of the enclosure are detected to obtain a delay time that it takes the solar radiation to pass from the outer wall to the inner wall, and the heat source is driven, after the delay time elapses, to move to a relatively low temperature area corresponding to a current solar time.

Preferably, a middle position between the position of the surrounding flow separation at the shady side and the position of the shady side of the enclosure corresponding to the irradiation direction of the solar radiation is selected as the relatively low temperature area.

Preferably, a temperature of the outer surface of the enclosure is detected to obtain an actual relatively low temperature area of the outer surface of the enclosure, and the temperature of the actual relatively low temperature area is compared with a temperature of a surface at the position of the surrounding flow separation at the shady side, and a temperature of a surface in the position of the shady side of the enclosure corresponding to the irradiation direction of the solar radiation, to obtain a relationship between an actual lowest temperature position and the position of the surrounding flow separation occurring at the shady side and the position of the shady side of the enclosure corresponding to the irradiation direction of the solar radiation.

Preferably, when it is overcast or at night, the position of the surrounding flow separation is taken as the relatively low temperature area.

Preferably, a temperature of the outer surface of the enclosure is detected, and the position of the surrounding flow separation at the shady side is taken as the relatively low temperature area when a difference between a temperature of a position of the shady side of the enclosure right corresponding to the irradiation direction of the solar radiation and a temperature of a sunlit side position irradiated by the solar radiation is not greater than a predetermined value.

Preferably, when a predetermined time after sunset has elapsed, the heat source is driven to return to an inner side position of the enclosure at a shady side corresponding to noon.

Preferably, a latitude and a longitude of a place where the enclosure is located are acquired, and a solar time for getting the irradiation direction of the solar radiation is read; or a solar azimuth and a solar elevation angle are detected to get the irradiation direction of the solar radiation.

Preferably, the parameters of the airflow are obtained by detection or acquired according to a meteorological wind rose plot of a place where the enclosure is located.

Preferably, a temperature of an outer wall and/or a temperature of an inner wall of the enclosure is detected to obtain the actual relatively low temperature area on a surface of the enclosure.

Preferably, a temperature of the outer wall and/or a temperature of the inner wall in a height direction of the enclosure is segmentally detected to segmentally obtain corresponding relatively low temperature areas.

Preferably, the heat source includes an electrical control cabinet, a transformer and/or a power transmission conductor provided inside the enclosure.

Preferably, the heat source is driven in real time to allow the heat source to be located in the relatively low temperature area in real time; or a cycle is set, and after the cycle elapses, the heat source is driven to allow the heat source to be located in a corresponding relatively low temperature area.

Preferably, the power transmission conductor is driven to move to the relatively low temperature area when at least one of the following conditions is met:

a grid-side switch of a grid-connected transformer connected to the power transmission conductor is in a closed state with power output; and a difference between a temperature of the power transmission conductor and a temperature of an outer wall or an inner wall of the enclosure is greater than a predetermined temperature difference.

Preferably, a surface temperature of the power transmission conductor is detected, and after the power transmission conductor is moved to the relatively low temperature area, if a decrease in the surface temperature of the power transmission conductor is not greater than a predetermined profit value, driving of the power transmission conductor to move is stopped.

Preferably, a surface of the power transmission conductor is divided into a plurality of areas according to magnitudes of the temperature, with higher temperature areas corresponding to lower predetermined profit values.

Another dynamic heat dissipation method for a heat source inside an enclosure is further provided according to the present application, which includes:

acquiring a relatively low temperature area of the enclosure; and outputting a control signal for driving the heat source to move to the relatively low temperature area.

Preferably, parameters of airflow outside the enclosure are read, a position of surrounding flow separation around an outer surface of the enclosure in contact with upward incoming flow is calculated and acquired, and the position is taken as the relatively low temperature area; or a latitude, a longitude and a solar time of a place where the enclosure is located are read, or a solar azimuth and a solar elevation angle detected are read to obtain a position of the shady side of the enclosure corresponding to an irradiation direction of solar radiation, and the position is taken as the relatively low temperature area; or a position between the position of surrounding flow separation at a shady side of the outer surface of the enclosure and the position of the shady side of the enclosure corresponding to the irradiation direction of the solar radiation, is taken as the relatively low temperature area.

A dynamic heat dissipation system inside an enclosure is further provided according to the present application, which includes:

a drive device configured to drive a heat source inside the enclosure to move; and a control system which is configured to acquire a relatively low temperature area of the enclosure and control the drive device to drive the heat source to move to the relatively low temperature area accordingly.

Preferably, the control system includes a parameter acquisition device, the parameter acquisition device acquires parameters of the airflow outside the enclosure, and the control system further includes a controller;

the controller acquires a position of surrounding flow separation around an outer surface of the enclosure in contact with upward incoming flow according to the parameters of the airflow outside the enclosure and takes the position as the relatively low temperature area; or the controller acquires a position of the shady side of the enclosure corresponding to an irradiation direction of solar radiation and takes the position of the shady side as the relatively low temperature area; or the controller selects a position, between a position of the surrounding flow separation at a shady side of the outer surface of the enclosure and a position of the shady side of the enclosure corresponding to an irradiation direction of solar radiation, as the relatively low temperature area.

Preferably, the controller selects a position between the position of the surrounding flow separation at the shady side of the outer surface of the enclosure and the position of the shady side of the enclosure corresponding to the irradiation direction of the solar radiation, as the relatively low temperature area.

Preferably, the control system further includes a temperature sensor for detecting a temperature of an outer wall of the enclosure, an actual relatively low temperature area is obtained according to the detected temperature, the actual relatively low temperature area is compared with the position of the surrounding flow separation occurring at the shady side and the position of the shady side of the enclosure corresponding to the irradiation direction of the solar radiation, to obtain a relationship between the actual relatively low temperature area and the position of the surrounding flow separation occurring at the shady side and the position of the shady side of the enclosure corresponding to the irradiation direction of the solar radiation.

Preferably, when it is overcast or at night, the controller takes the position of the surrounding flow separation as the relatively low temperature area.

Preferably, the control system further includes a temperature sensor for detecting a temperature of an outer wall of the enclosure, and when a difference between a temperature of a position at a shady side of the enclosure right corresponding to the irradiation direction of the solar radiation and a temperature of a position at a sunlit side irradiated by the solar radiation is not greater than a predetermined value, the position of the surrounding flow separation at the shady side is taken as the relatively low temperature area.

Preferably, the parameter acquisition device includes a wind direction sensor, a wind speed sensor and a wind field airflow temperature sensor for detecting the parameters of the airflow; and/or a meteorological wind rose plot of a place where the enclosure is located is stored in the controller, which thus obtains the parameters of the airflow outside the enclosure during a corresponding period of time.

Preferably, the control system further includes temperature sensors for detecting a temperature of an outer wall and/or a temperature of an inner wall of the enclosure to obtain the relatively low temperature area.

Preferably, a plurality of the temperature sensors are provided in a height direction of the enclosure to segmentally obtain relatively low temperature areas; and the plurality of the temperature sensors are connected via a communication bus.

Preferably, the temperature sensor is a contact sensor, and a non-contact surface of a temperature sensing member exposed to outside, of the temperature sensor has a thermal insulation layer.

Preferably, the heat source includes an electrical control cabinet, a transformer and/or a power transmission conductor which are provided inside the enclosure.

Preferably, a bearing component is provided inside the enclosure, the heat source is placed on the bearing component, and the drive device drives the bearing component to move for driving the heat source to move to the relatively low temperature area.

Preferably, the bearing component includes a carrying bracket, a segment of the power transmission conductor is carried on a bearing surface of the carrying bracket, the bearing surface is formed in the shape of an arc; a segment of the electric power transmission conductor above the carrying bracket forms an arc-shaped hanging segment in front of the carrying bracket and a segment of the electric power transmission conductor below the carrying bracket is hung from the carrying bracket behind the carrying bracket; and the drive device includes a first drive unit, which is configured to drive the carrying bracket to rotate so as to drive segments of the power transmission conductor carried on the bearing surface and below the bearing surface to a relatively low temperature area of the enclosure.

Preferably, the drive device further includes a second drive unit, which is configured to drive the segment of the power transmission conductor below the carrying bracket to rotate synchronously with the carrying bracket.

Preferably, a platform is provided inside the enclosure, the platform is provided with a rotating plate rotationally connected to the platform, the carrying bracket is provided on the rotating plate, and the first drive unit is configured to drive the rotating plate to rotate.

Preferably, the rotating plate is fan-shaped, a small arc-shaped end of the rotating plate is provided with a rotating shaft which is mounted on the platform, and the rotating plate rotates about the rotating shaft.

Preferably, the bearing component includes a carrying bracket, a segment of the power transmission conductor is carried on a bearing surface of the carrying bracket, the bearing surface is formed in the shape of an arc; a segment of the electric power transmission conductor above the carrying bracket forms an arc-shaped hanging segment in front of the carrying bracket and a segment of the electric power transmission conductor below the carrying bracket is hung from the carrying bracket behind the carrying bracket; and the power transmission conductor is positioned on the carrying bracket, and the drive device drives only the segment of the power transmission conductor below the bearing surface to move to the relatively low temperature area.

Preferably, a controller controls the drive device to drive the heat source in real time to allow the heat source to be located in the relatively low temperature area in real time; or a cycle is set in the controller, and after the cycle elapses, the heat source is driven to be located in the corresponding relatively low temperature area.

Preferably, the power transmission conductor inside the enclosure is connected to a power grid via a grid-connected transformer; and a controller controls the drive device to drive the power transmission conductor to move to the relatively low temperature area when the controller determines that at least one of the following conditions is met:

a grid-side switch of the grid-connected transformer is in a closed state with power output; and a difference between a temperature of the power transmission conductor and a temperature of an outer wall or an inner wall of the enclosure is greater than a predetermined temperature difference.

Preferably, the dynamic heat dissipation system inside the enclosure further includes a traction cable which moves along with the power transmission conductor, wherein the power transmission conductor is segmentally secured to the traction cable, and the traction cable is connected to a platform inside the enclosure.

Preferably, the dynamic heat dissipation system inside the enclosure further includes a carrying bracket provided on the platform, the electric power transmission conductor above the carrying bracket forms an arc-shaped hanging segment in front of the carrying bracket and a segment of the electric power transmission conductor below the carrying bracket hangs down behind the carrying bracket;

the drive device is configured to drive the carrying bracket to rotate, so as to drive the segment of the power transmission conductor carried on the bearing surface and the segment of the power transmission conductor below the bearing surface to a relatively low temperature area of the enclosure; and an upper end of the traction cable is secured to the carrying bracket, or the upper end of the traction cable is slidably connected to the platform; and the traction cable is a wire rope or a braided strap.

Preferably, the dynamic heat dissipation system inside the enclosure includes multiple fixtures. Multiple power transmission conductors are provided, and the multiple power transmission conductors are segmentally positioned in corresponding through holes of the multiple fixtures. The fixtures are secured to the traction cable.

Preferably, the power transmission conductor is bent back and forth on a projection plane of an inner wall of the enclosure and/or a projection plane of a radial vertical surface of the enclosure.

Preferably, an inner wall of the enclosure is provided with tracks, and the power transmission conductor is carried on the carrying bracket inside the enclosure, the drive device includes servomotors, the servomotors move along the tracks to drive a segment of the power transmission conductor below the carrying bracket to rotate.

Preferably, multiple tracks and multiple servomotors corresponding to the multiple tracks are provided in the height direction of the enclosure.

Preferably, the dynamic heat dissipation system inside the enclosure further includes a rack and a gear engageable with each other, the gear is connected to an output shaft of the servomotor, and the rack is provided on an inner wall of the enclosure.

Preferably, the rack is engaged with the gear in a radial direction of the enclosure; and the servomotor is provided with a running roller moving horizontally along the track.

Preferably, the track is provided with a rack which is engaged with the gear in a vertical direction.

Preferably, the inner wall of the enclosure is provided with a support, the servomotor is located between the support and the track, and the servomotor is provided with a support wheel which is configured to move along the support.

Preferably, the support is provided above the servomotor, and the track is located below the servomotor.

Preferably, each of the rack, the track and the support is in the shape of an arc, a straight line or a fold line.

Preferably, a base bracket is provided inside the enclosure, and the base bracket is supported at a bottom of the enclosure or supported at a foundation of the enclosure, and the corresponding heat source is driven to move along the base bracket; there is a spacing between the base bracket and an inner wall of the enclosure.

Preferably, the base bracket is a lattice tower structure provided inside the enclosure; the heat source includes an electrical control cabinet, a transformer and/or a power transmission conductor connected to the transformer.

An enclosure having the dynamic heat dissipation system according to any one of the above aspects is further provided according to the present application. The enclosure includes a tower of a wind generator set or a building exterior wall of a television tower, or a heat source located inside a housing of a water surface vehicle or an aviation vehicle; the heat source located inside the water surface vehicle or the aviation vehicle includes a fuel tank, and the drive device drives liquid fuel inside the fuel tank to move to the relatively low temperature area.

The core of the dynamic heat dissipating method and the dynamic heat dissipating system for the enclosure and the heat source inside the enclosure according to the present application is that: a heat source, which is located inside the enclosure at a relatively fixed position in a conventional sense, is artificially and actively transformed into a mobile heat source in a subversive manner, so as to allow the heat source to be self-adapted to the temperature field; a relatively low temperature area inside the enclosure is searched; according to the characteristics of temperature differences existing in the temperature field of the enclosure, the position of the heat source (located in proximity to an inner wall of the enclosure) is adjusted so as to adjust the heat dissipation layout inside the enclosure, thereby providing the heat source with an optimal direction (a direction of a temperature gradient) of heat transfer from the inside to the outside of the enclosure and an enclosure heat dissipation layout in which the heat is dissipated to the outside at a maximum rate for the heat source, that is, dissipating the heat dynamically. Therefore, the operating temperature of the mobile heat source is reduced, the service life of the mobile heat source is extended, and the reliability and safety of the system are improved.

BRIEF DESCRIPTION OF THE DRAWINGS

FIG. 1-2 is a schematic view of the composition of a sol-air temperature outside the tower in summer in the conventional technology;

FIG. 1-3 shows sol-air temperatures of the tower in the conventional technology in different orientations;

FIG. 2-1 is a schematic view of a boundary layer formed when an upward incoming flow externally flows over the tower;

FIG. 2-2 is a schematic view showing the surrounding flow separation occurring in FIG. 2-1;

FIG. 2-3 is a graph showing changes of Nusselt numbers Nu of a local surface of the tower as a function of the angle at three different Reynolds numbers Re when the airflow externally flows over the tower;

FIG. 3-1 shows the position of the reverse flow of the surrounding flow separation generated by the upward incoming flow from a southwest direction outside the tower according to an embodiment of the present application, showing the power transmission conductor located at this position;

FIG. 3-2 shows the position of the backflow of the surrounding flow separation generated by the upward incoming flow from a southeast direction of the tower, showing the power transmission conductor located at this position;

FIG. 4-1 is a schematic view of a relatively low temperature area determined based on both the position of the surrounding flow separation and irradiation of the solar radiation, and shows that the upward incoming flow comes from a southwest direction;

FIG. 4-2 is a schematic view of the relatively low temperature area determined based on both the position of the surrounding flow separation and the irradiation of the solar radiation, and shows that the upward incoming flow comes from a southeast direction;

FIG. 4-3 is a flow chart showing determination of the relatively low temperature area based on both the position of the surrounding flow separation and the irradiation of the solar radiation and control on movement of the power transmission conductor;

FIG. 4-4 is a schematic view showing a relationship between a shady side of the tower wall and an irradiation direction of the solar radiation;

FIG. 5-1 is a schematic view showing a range where a place is exposed to the solar radiation in summer and a range where a high temperature and a rainstorm may occur in this place in summer, with the place being the one where the tower is located;

FIG. 5-2 is a schematic view showing temperature sensors provided at a sunlit side of the tower;

FIG. 8-1 is a schematic view of a wind power generator grid-connected to electric power according to an embodiment of the present application;

FIG. 8-2 is a schematic view showing the structure of the power transmission conductors each being provided with a temperature sensor according to an embodiment of the present application;

FIG. 9-1 is a schematic view showing a typical laying solution of the power transmission conductors inside the tower;

FIG. 9-2 is a schematic view showing the structure of a carrying bracket in FIG. 9-1;

FIG. 13-1 is a schematic view showing the structure of a drive device in FIG. 12 moving along the tower wall;

FIG. 13-2 is a schematic view of a gear and an arc-shaped rack in FIG. 13-1 in cooperation with each other and is a top view of FIG. 13-1;

FIG. 13-3 is a schematic view of a circular arc-shaped support and a support wheel in FIG. 13-1 in cooperation with each other;

FIG. 14-1 is a schematic view showing the structure of the drive device in FIG. 7 moving along the tower wall;

FIG. 14-2 is a schematic view of the gear and the arc-shaped rack in FIG. 14-1 in cooperation with each other and is a top view of FIG. 14-1;

FIG. 14-3 is a schematic view of an arc-shaped support and a support wheel in FIG. 14-1 in cooperation with each other;

FIG. 15-1 is a schematic view showing a first inclined arrangement of the power transmission conductor according to an embodiment of the present application;

FIG. 15-2 is a schematic view showing a second inclined arrangement of the power transmission conductor according to the embodiment of the present application;

FIG. 15-3 is a schematic view showing a third inclined arrangement of the power transmission conductor according to the embodiment of the present application;

FIG. 15-4 is a schematic view showing a fourth inclined arrangement of the power transmission conductor according to the embodiment of the present application.

EXPLANATION OF REFERENCE NUMERALS IN FIGS. 1-1 TO 1-3

Figure 1:
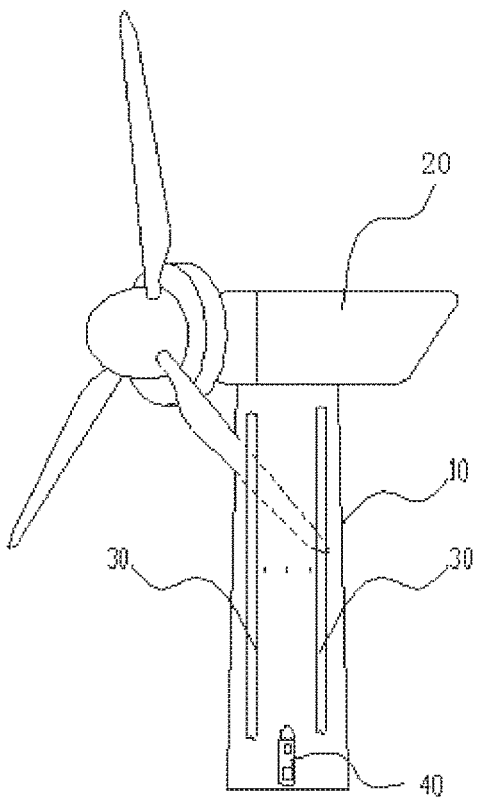
FIG. 1-1 a schematic view showing the structure of a tower in the conventional technology.

| | |
|---|---|
| 10. tower wall, | 20. nacelle, |
| 30. power transmission cable, | 40. tower door. |

REFERENCE NUMERALS IN FIG. 2-1 TO FIG. 18

| | |
|---|---|
| 1. tower, | 1'. lattice tower structure, |
| 1''. base platform, | 2. blade, |
| 3. wind power generator, | 4. electric energy output and transmission conductor; |
| 5. platform, | 51. carrying bracket, |
| 511. bearing surface, | 52. rotating plate, |
| 53. first drive unit, | 54. first output shaft, |
| 55. controller, | 61. second drive unit, |
| 62. second output shaft, | 71. arc-shaped track, |
| 711. track connector, | 72. arc-shaped rack, |

-continued 721. rack connector,
74. running roller,
76. arc-shaped support,
82. power transmitter,
84. power grid,
91. locking clip,
100. tower wall,
200a. communication bus,
301. arc-shaped hanging segment,
500. wind direction sensor,
700. steel wire rope,
800a. through hole, 73. gear,
75. support wheel,
81. grid-connected transformer,
83. grid-side transmission pole,
85. grid-side switch,
92. clamping member,
200. temperature sensor,
300. power transmission conductor,
400. wind speed sensor,
600. wind filed air temperature sensor,
800. fixture,
900. electrical device.

DETAILED DESCRIPTION OF EMBODIMENTS

In order to make the person skilled in the art have a better understanding of the technical solutions of the present application, the present application is described hereinafter in further detail in conjunction the drawings and embodiments. For ease of understanding and simplicity of description, an enclosure and a dynamic heat dissipation method for a heat source and a dynamic heat dissipation system inside the enclosure are described herein as a whole, and the beneficial effects are not repeated.

In a solution of the present application, the dynamic heat dissipation method for the heat source inside the enclosure includes:

acquiring a relatively low temperature area of the enclosure; and driving the heat source to move to the relatively low temperature area.

The core of the present application is that: a heat source, which is located at a relatively fixed position inside the enclosure in a conventional sense, is designedly and actively transformed into a mobile heat source dramatically, so as to allow the heat source to self-adapt to a temperature field, a relatively low temperature area inside the enclosure is searched, and the position of the heat source (near to an inner wall of the enclosure) and the heat dissipation layout inside the enclosure are adjusted according to the characteristics of temperature differences existing in the temperature field of the enclosure, thereby providing the heat source with an optimal direction (a direction of a temperature gradient) of heat transfer from the inside to the outside of the enclosure and an enclosure heat dissipation layout in which the heat is dissipated to the outside at a maximum rate, that is, dissipating the heat dynamically. Therefore, the operating temperature of the mobile heat source is reduced, the service life of the mobile heat source is extended, and the reliability and safety of the system are improved.

It should be understood that, the heat source herein does not necessarily include all the heat sources inside the enclosure, such as a conductor, cables, an electrical device, a heat generation device (a bearing component), as long as the heat source can be moved, it belongs to the heat source mentioned in the present application.

It can be known that, although some heat sources cannot be moved to dissipate the heat more quickly, the dynamic heat dissipation of part of the heat sources provides an environment inside the tower with a low heat storage speed, for other electrical devices and heat generation devices, that is, an overall rate of temperature rise is restrained, thereby providing a better heat dissipation layout for the inside of the enclosure. Accordingly, the configuration capacity of a cooling device inside the enclosure is also reduced, the initial investment cost is reduced indirectly, and the later operation cost may also be reduced. In addition, compared with a heat dissipation method typically using a high-power blower in the conventional technology, such a dynamic heat dissipation method of active movement plays a creative role by means of the first law and the second law of thermodynamics, pays the lowest cost in restraining the temperature rise, and has characteristics of environmental protection, having a low energy consumption, low noise and requiring hardly any external power (there is a relatively low power demand for driving the heat source to move).

It may be known from the above core idea of the dynamic heat dissipation that, based on the second law of thermodynamics, the final heat dissipation of the heat source requires the heat source to move to the corresponding relatively low temperature area. Apparently, the relatively low temperature area is an area where the temperature is relatively low with respect to the entire enclosure. The relatively low temperature area of the enclosure often indicates that both the temperature of an outer surface of the enclosure, to which the relatively low temperature area corresponds, and the outer ambient temperature outside the outer surface are relatively low. Moving the heat source to the relatively low temperature area is intended to achieve a better heat dissipation effect by using such a large "cold source", i.e. the external environment to which the relatively low temperature area corresponds. Multiple implementations are provided herein to acquire the relatively low temperature area of the enclosure. Of course, since this solution aims at the heat source inside the enclosure, no matter which method is used to determine the relatively low temperature area, the relatively low temperature area must be located inside the enclosure. Based on the example of the tower structure described hereinafter, the relatively low temperature area mainly refers to an area at an inner side of a tower wall 100, where the temperature is relatively low.

In the following embodiment, a tower 1 is exemplarily illustrated as a specific enclosure. The tower 1 mainly includes a tower wall 100. A nacelle is provided at a top end of the tower 1. Heat sources such as an electrical device (such as a transformer) and a power transmission conductor 300 are provided inside the tower 1. The relatively low temperature area of the tower 1 is selected mainly by searching for a relatively low temperature area of the tower wall 100, so as to utilize a cold source such as the external environment outside the tower wall 100. For other types of enclosures, the relatively low temperature area also mainly refers to a low temperature area of a wall of the enclosure in a circumferential direction. Here, the heat source is described mainly by taking the power transmission conductor 300 as an example.

Figures 1, 2:
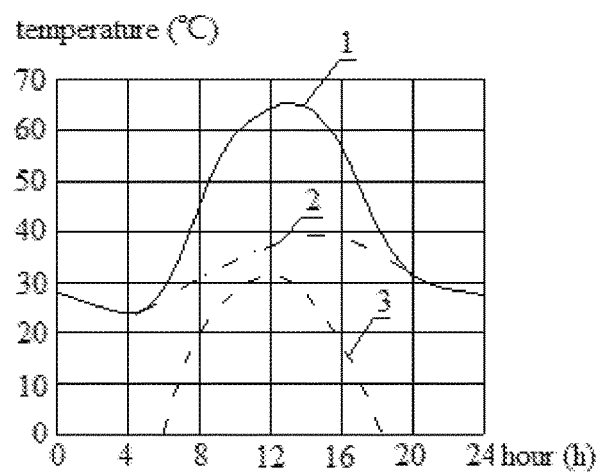

Reference is made to FIGS. 2-1 and 2-2. FIG. 2-1 is a schematic view of a boundary layer formed when an upward incoming flow externally flows over the tower. FIG. 2-2 is a schematic view when detachment of surrounding flow occurs in FIG. 2-1.

As shown in FIG. 2-1, when the upward incoming flow flows over the tower wall 100, the pressure, the flow velocity and the flow direction of the airflow in the boundary layer may change greatly along a curved surface of the tower wall 100, thus affecting heat exchange. Due to the change of the flow interface, the pressure of the airflow descends progressively approximately at a front half of the tower wall 100, i.e., $$\left(\frac{dp}{dx}\right)_x$$

is less than zero, then tends to increase, i.e., $$\left(\frac{dp}{dx}\right)_x$$

is greater than zero. It is to be particularly noted that, as the airflow in the boundary layer of the wall surface of the tower wall 100 flows forward continuously, the kinetic energy of the airflow gradually becomes lower, and the velocity of the airflow inside the boundary layer is lower than the velocity of the airflow outside the boundary layer, and the corresponding kinetic energy of the airflow inside the boundary layer is also small. Due to the consumption of the kinetic energy, the velocity gradient of the airflow on the curved wall surface of the tower will approximate to zero at a certain position on the wall surface, that is, $$\left(\frac{\partial u}{\partial y}\right)_w = 0.$$

As shown in FIG. 2-1 and FIG. 2-2, at a starting point of the dotted line I, the airflow passing over the wall surface of the tower wall 100 stops flowing forward, and then flows in the opposite direction since $$\left(\frac{dp}{dx}\right)_x$$

in the rightward direction (x direction) along the curved surface is greater then 0, thereby forming the reverse flow as shown in FIG. 2-1. The starting point of the dotted line I on the wall surface in FIG. 2-2 is referred to as a starting point of the surrounding flow separation (or referred to as a separation point, as a boundary layer separation point shown in FIG. 2-1), and from this point, reverse flow occurs in the boundary layer, thus forming a vortex, which destroys normal flow of the boundary layer. That is, the position corresponding to the largest heat exchange efficiency is actually not the position on the tower wall 100 to which the upward incoming flow exactly faces, but is a position at two sides of the tower wall 100, and accordingly, the position at two sides of the tower wall 100 should be the position where the heat exchange efficiency is the largest.

In this solution, the change of surface heat transfer coefficients at corresponding positions of the tower wall 100 may be acquired through the parameters of the airflow outside the tower, to reflect the positions corresponding to low and high heat exchange efficiencies. In fact, it may be understood that the acquired position corresponding to the largest surface heat transfer coefficient is just the position where the surrounding flow separation occurs.

The surface heat transfer coefficient may be expressed specifically by the Nusselt number of convective heat transfer in the heat transfer theory, that is:

$$Nu = \frac{hL}{\lambda}$$

(L indicates a geometrical feature length of a heat transfer surface, for an enclosure like the tower, L is embodied as the diameter of the tower, h indicates a surface heat transfer coefficient of the surface of the tower wall 100 in contact with the airflow, and λ indicates the thermal conductivity coefficient of the still air). The Nusselt number Nu is a dimensionless number which can indirectly reflect the magnitude of the surface heat transfer coefficient of the tower. The surface heat transfer coefficient is determined by multiple parameters. According to the principle of heat transfer, the Nusselt number Nu may simplify acquisition of the surface heat transfer coefficient.

When acquiring the Nusselt number Nu, the corresponding Reynolds number Re $$(Re = \frac{\rho u d}{\mu},$$

ρ indicates the density of the airflow, μ indicates the viscosity coefficient of the airflow, d indicates the outer diameter of the tower wall 100, and u indicates the flow velocity of the airflow at a periphery of the tower) may be acquired based on the parameters of the airflow (the temperature, the relative humidity, the density, the viscosity coefficient, the wind direction) outside the tower, and then change of the surface heat transfer coefficient of the convective flow formed by an outer wall of the tower wall 100 in contact with the airflow at different Reynolds numbers Re are established. And the relationship between the position of the detachment of flow around a cylindrical enclosure (e.g. the tower) and different Reynolds numbers Re at different Reynolds numbers Re may be obtained by an experimental method. The position of the detachment of flow around the enclosure corresponds to an area where the surface heat transfer coefficient is the maximum or about the maximum, and represents a range.

Figures 1, 2, 3:
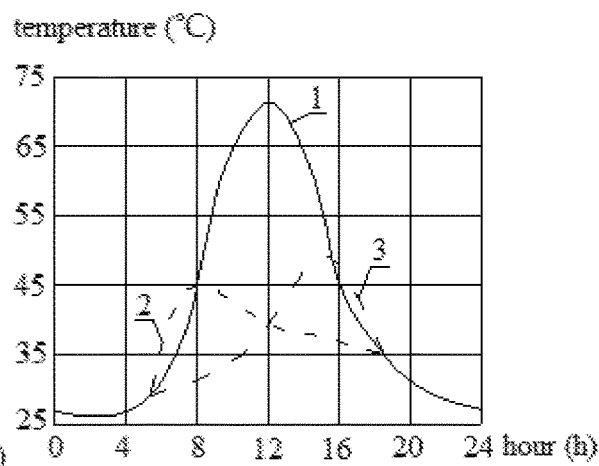
Figures 1, 2:
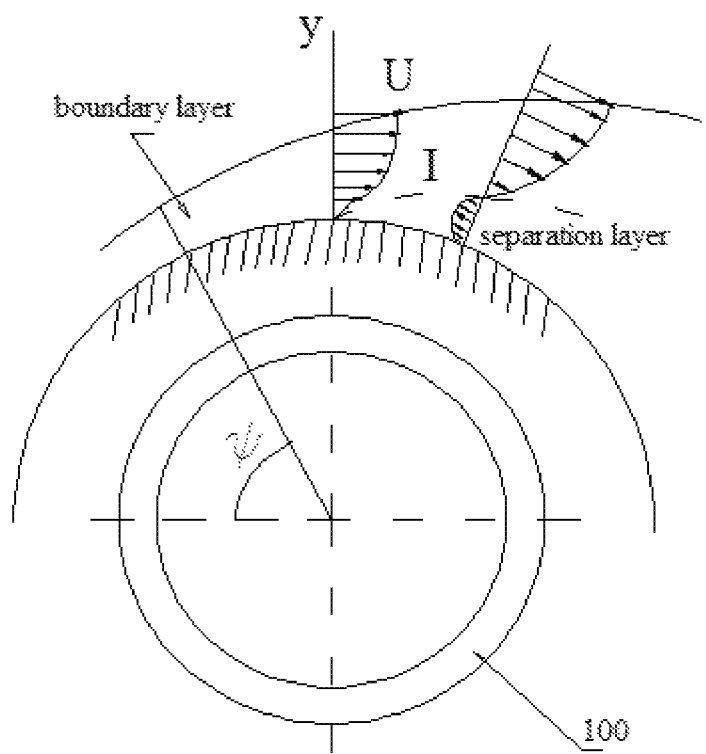
Figure 2:
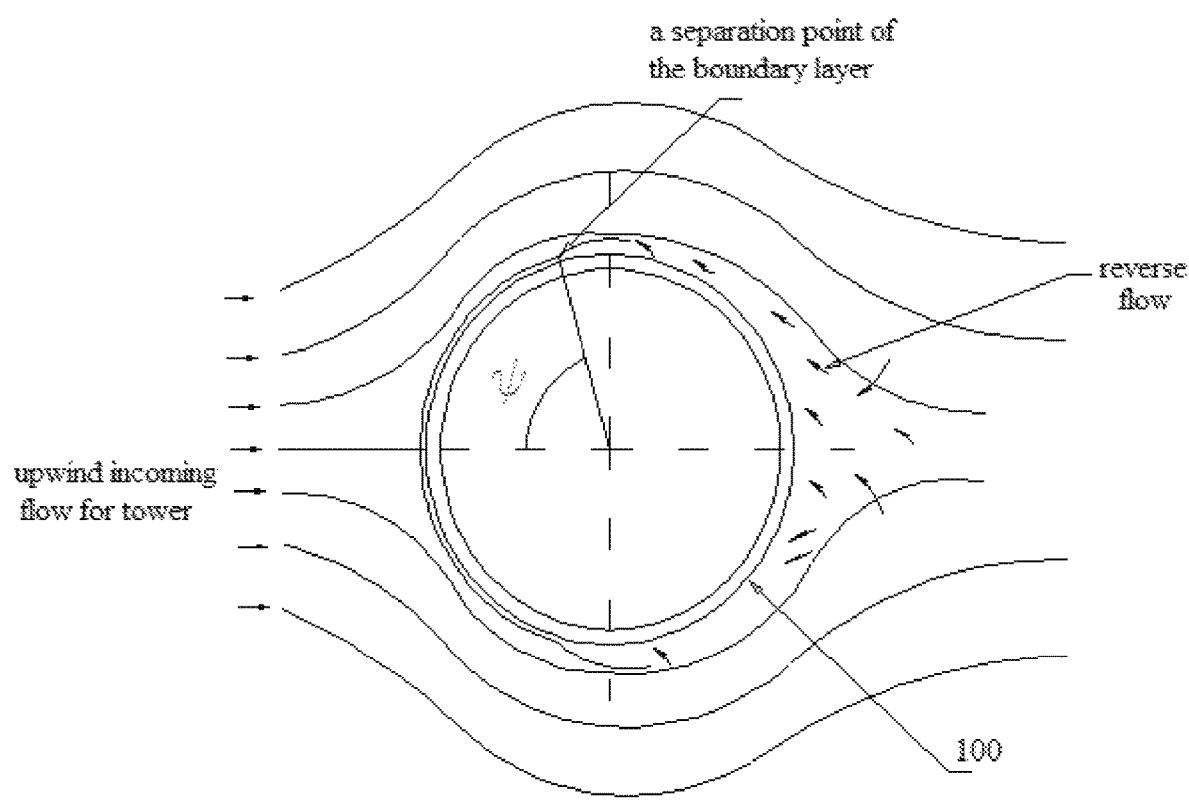
Figures 2, 3:
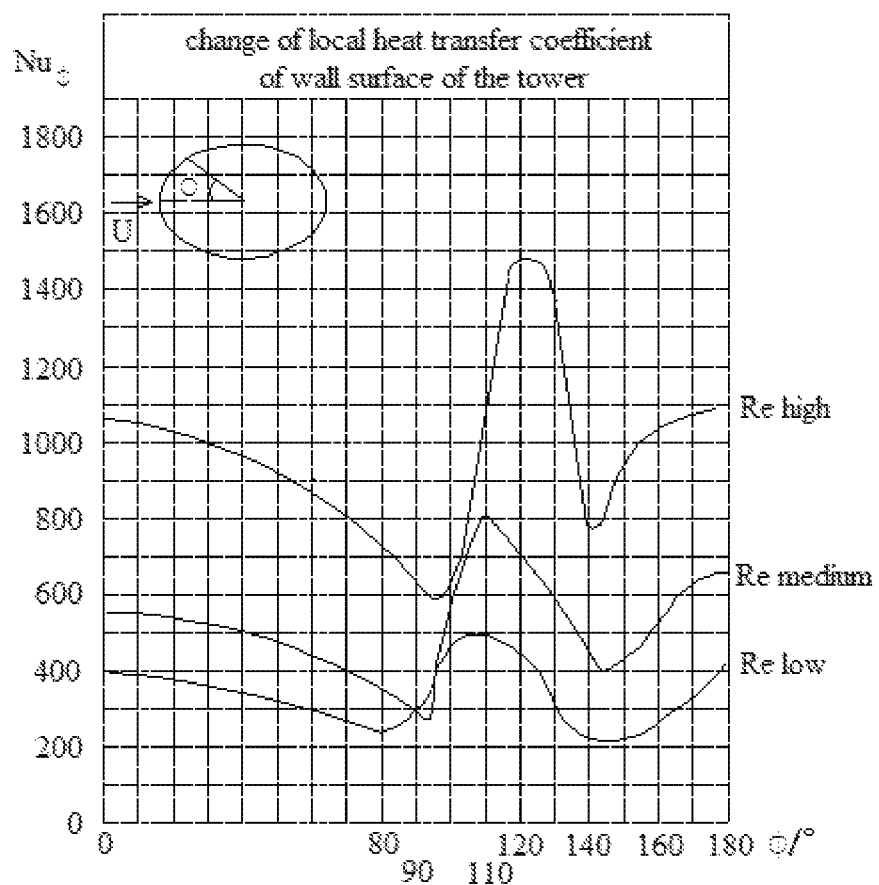
Figures 1, 3:
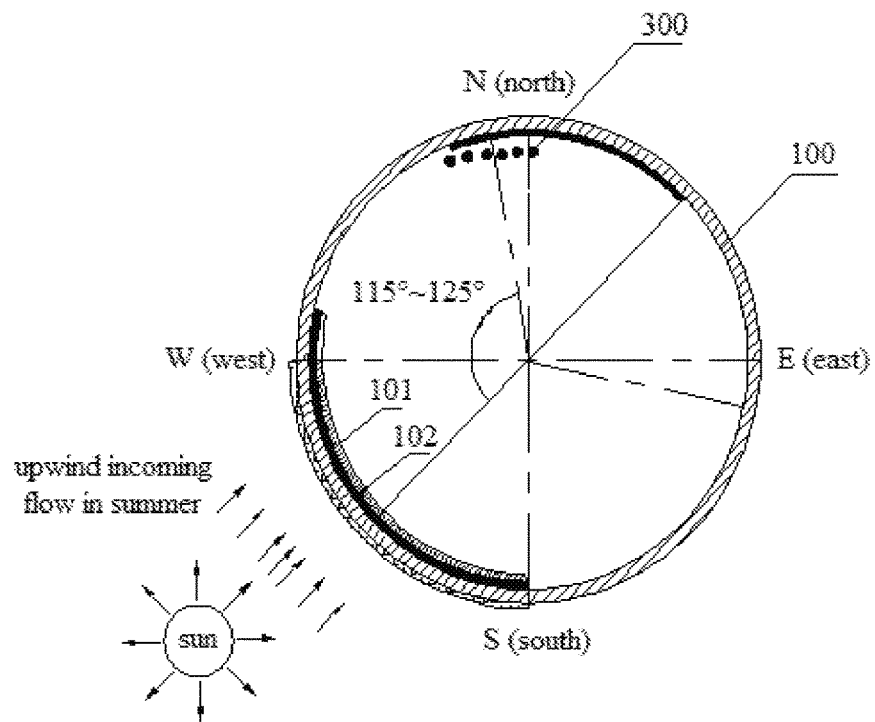
Figures 2, 3:
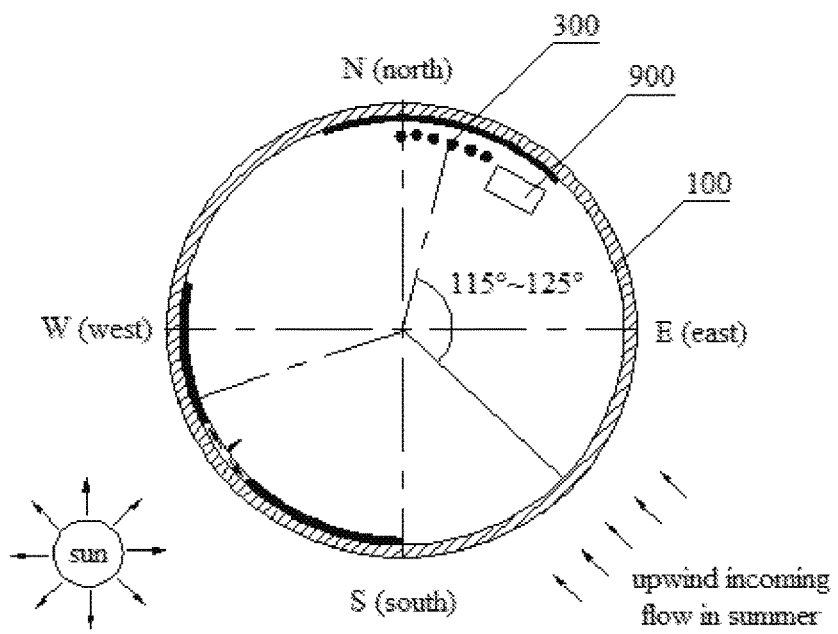

Reference is further made to FIG. 2-3. FIG. 2-3 is a curve graph showing changes of Nusselt numbers Nu of a local surface of the tower as a function of the angle at three different Reynolds numbers Re when the airflow externally flows over the tower. The local surface here specifically covers a range from the position of a normal vector of a contact surface, where the upward incoming flow comes into contact with the tower wall 100, to the position of 180 degrees northward.

In this figure, three continuous curves are shown and correspond to three Reynolds numbers Re respectively. The Reynolds numbers Re gradually increase from a lower side to an upper side, the vertical axis represents the Nusselt number Nu and the horizontal axis represents the angle. It may be seen from the figure that, three peaks of the Nusselt number Nu, which may reflect the surface heat transfer coefficient, in the three curves approximately appear at a position corresponding to an angle range from 115 degrees to 125 degrees, that is, as the Reynolds numbers Re increase, the peaks of the Nusselt number Nu also gradually increase. The position having an included angle ranging from 115 degrees to 125 degrees with respect to the upward incoming flow is the position where the surrounding flow is detached and flows reversely. At this position and this orientation, the surface heat transfer coefficient of the heat exchange between the airflow and the outer wall of the tower is maximum. It should be noted that, the position of the surrounding flow separation represents a range, e.g. an angle range from 115 degrees to 125 degrees as described above.

The present application may be understood further in conjunction with FIG. 3-1 and FIG. 3-2. FIG. 3-1 shows the position of the reverse flow of the surrounding flow separation generated by the upward incoming flow from a southwest direction outside the tower according to an embodiment of the present application, and shows that the power transmission conductor 300 is located at this position. FIG. 3-2 shows the position of the backflow of the surrounding flow separation generated by the upward incoming flow coming from a southeast direction of the tower, and shows the power transmission conductor 300 is located at this position.

It may be known from the above analysis that, according to the principle of the surrounding flow separation, the heat exchange efficiency is maximum at the position where the surrounding flow separation occurs, and the temperature in the position of the surrounding flow separation should be even lower when the position of the surrounding flow separation is within a large range with a lower temperature, thus the position of the surrounding flow separation is the relatively low-temperature area that needs to be searched in the present application.

Figures 1, 4:
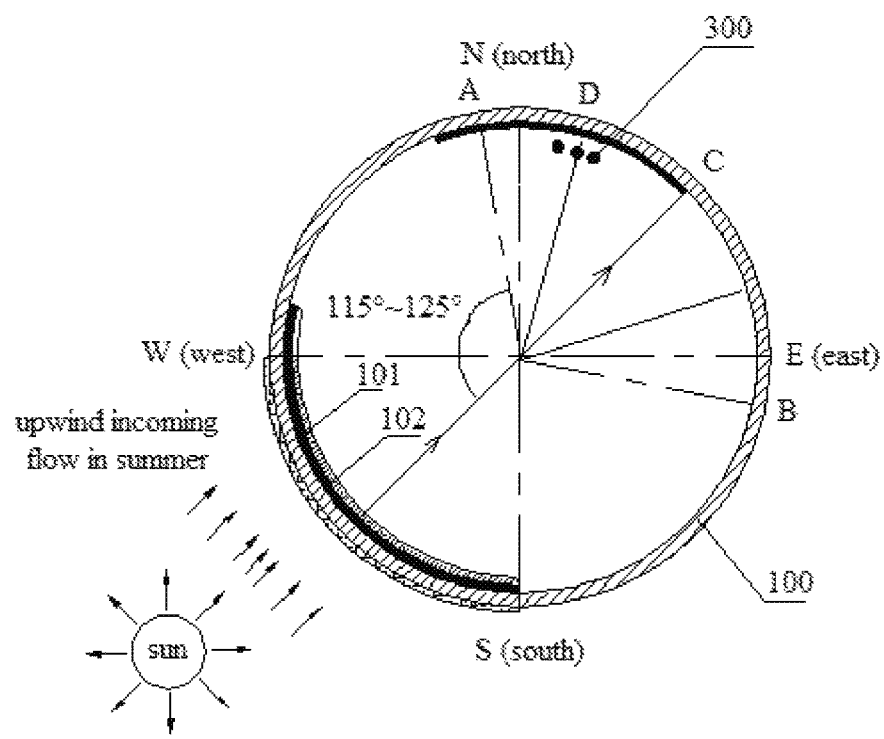
Figures 2, 4:
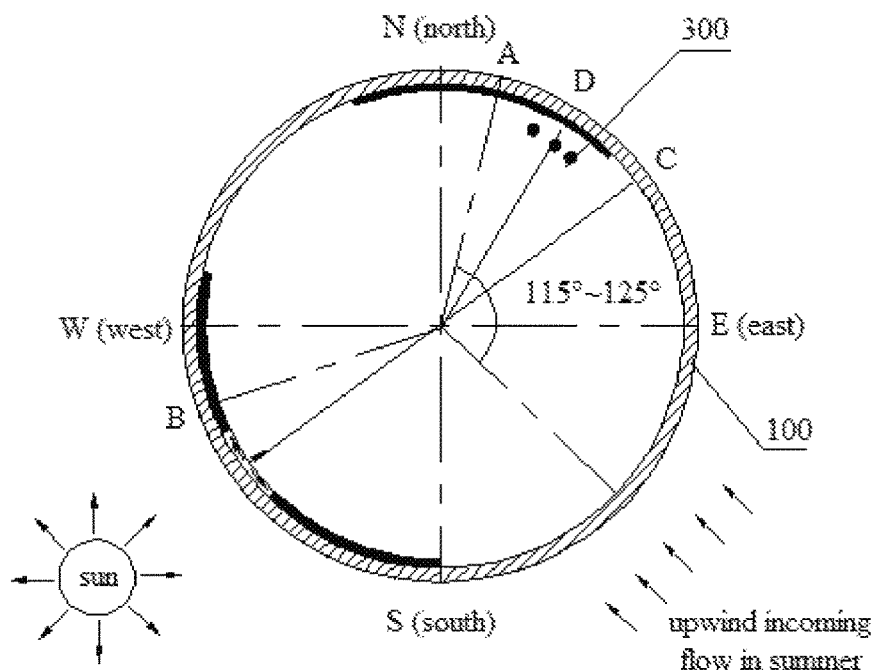
Figures 3, 4:
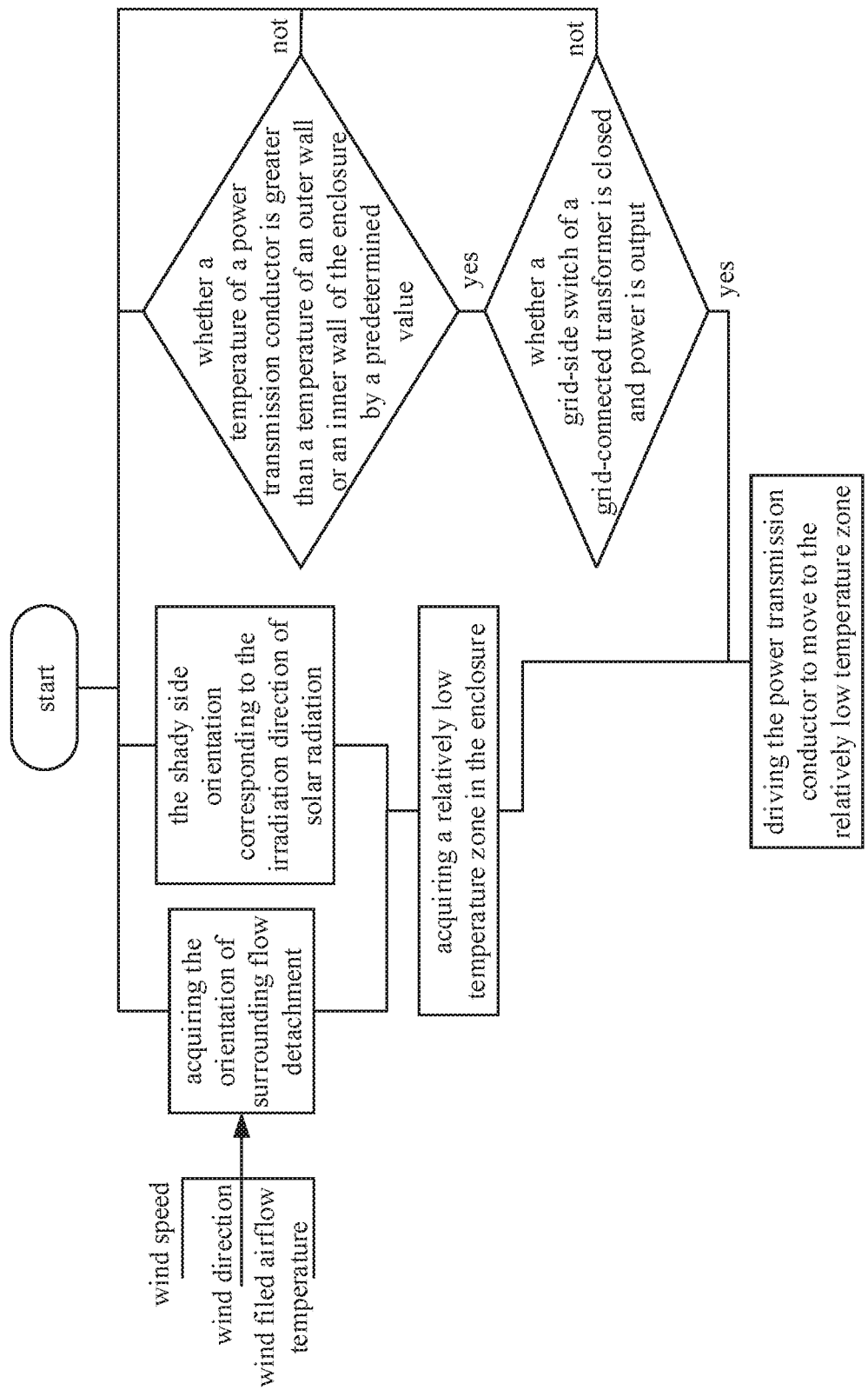
Figure 4:
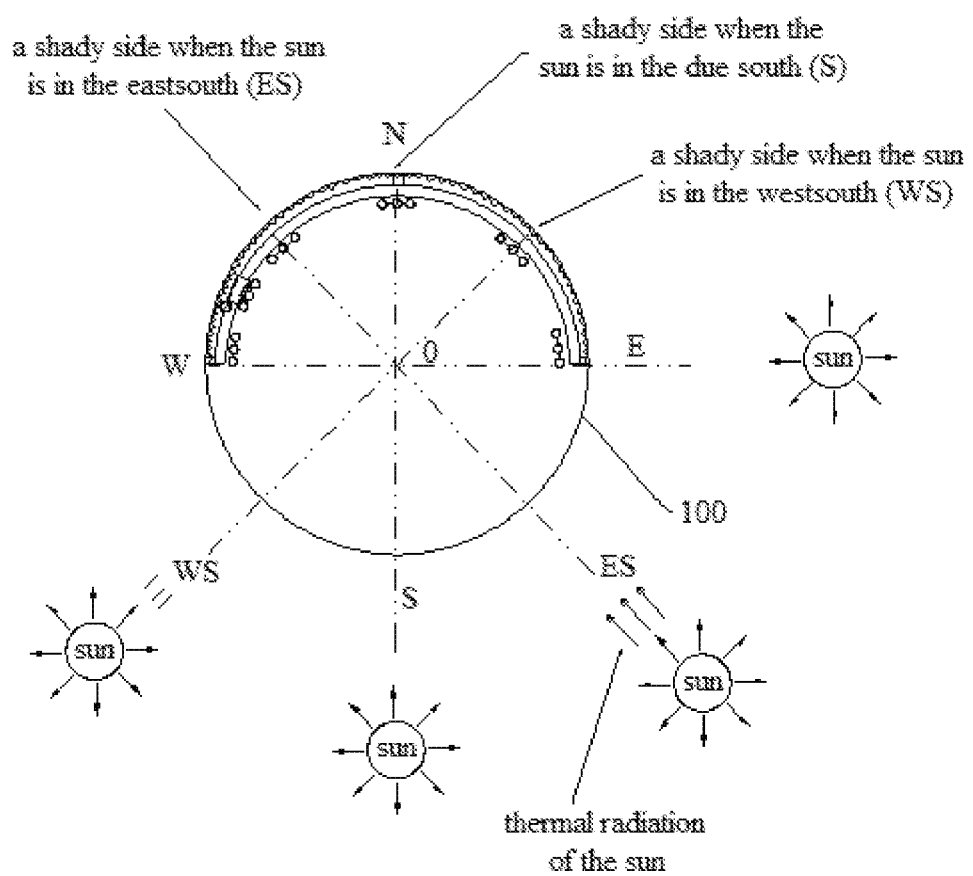

In addition, reference is further made to FIG. 4-1 and FIG. 4-2. FIG. 4-1 is a schematic view of the relatively low-temperature area determined based on both the position of the surrounding flow separation and irradiation of the solar radiation when the upward incoming flow comes from a southwest direction. FIG. 4-2 is a schematic view of the relatively low-temperature area determined based on both the position of the surrounding flow separation and the irradiation of the solar radiation when the upward incoming flow comes from a southeast direction. FIG. 4-3 is a flow chart showing determination of the relatively low-temperature area based on both the position of the surrounding flow separation and the irradiation of the solar radiation as well as control of movement of the power transmission conductor. FIG. 4-4 is a schematic view showing the relationship between a shady side of the tower wall and an irradiation direction of the solar radiation.

In this solution, the relatively low temperature area is determined not only by the position of the surrounding flow separation but also in combination with the influence of the solar radiation. A shady side of the tower wall 100 just corresponding to the irradiation direction of the solar radiation is namely an outer surface of the tower wall 100 corresponding to the rays emitted by the sun passing through the center of the circumference of the tower wall 100 in a radial direction of the tower wall 100. According to the path of the light ray, it is generally understood that the temperature at the just corresponding shady side should be relatively lower. Therefore, as a solution, it is possible to select the relatively low temperature area only based on the solar radiation.

It should be known that, the shady side mentioned in the present application is a relatively dynamic concept, and as the direction of solar irradiation changes, the area where the shady side is located changes accordingly. As shown in FIG. 4-4, three corresponding relationships between the irradiation direction of the solar radiation and the shady side are exemplified. When the solar irradiation is from the southeast direction ES, the shady side is located in a northwest area. When the solar irradiation is from a due south direction S, the shady side is located in a due north area. When the solar irradiation is from the southwest direction WS, the shady side is located in a northeast area.

That is, the term "shady side" described herein refers to an area where the outer surface of the tower wall 100 is not directly irradiated by the sun. In fact, the area which may be directly irradiated by the sun is primarily an area between the Tropic of Capricorn and the Tropic of Cancer, that is, between 23.5 degrees south latitude to 23.5 degrees north latitude. At places beyond this area, the sunlight mainly irradiates obliquely. China is located in the northern hemisphere, and the sunlight irradiates from the south, thus the shady side in FIG. 3-1 to FIG. 4-2 is mainly located at a north side (such as the northwest side, the due north side or the northeast side described above). For a wind turbine tower in a country in the southern hemisphere, the sunlight irradiates from the north at around noon, and in this case the shady side is naturally located at a south side of the tower wall 100.

Figures 1, 5:
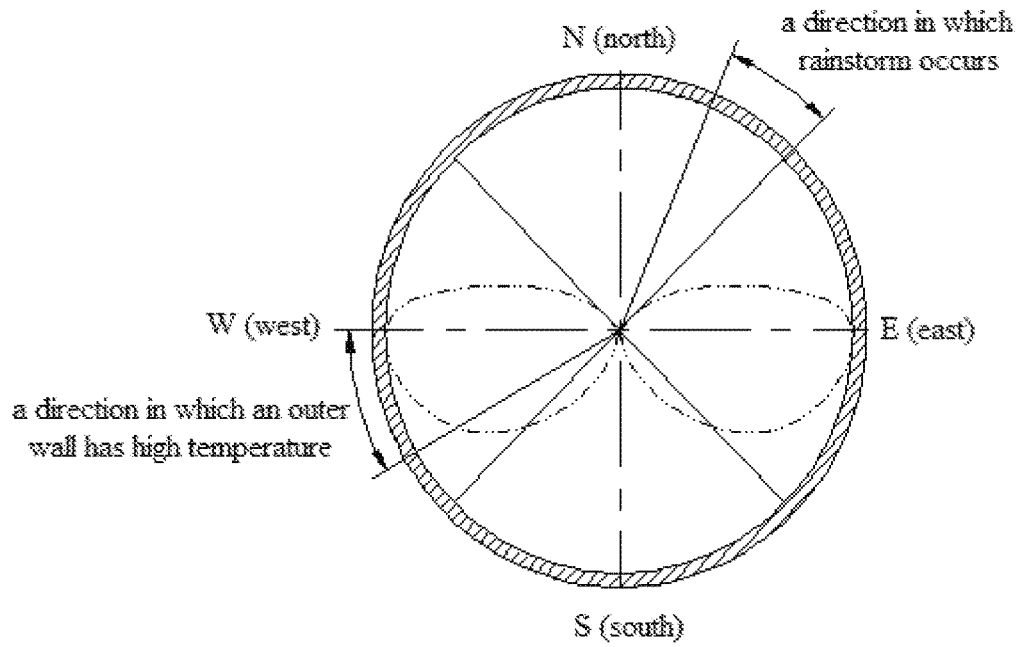
Figures 2, 5:
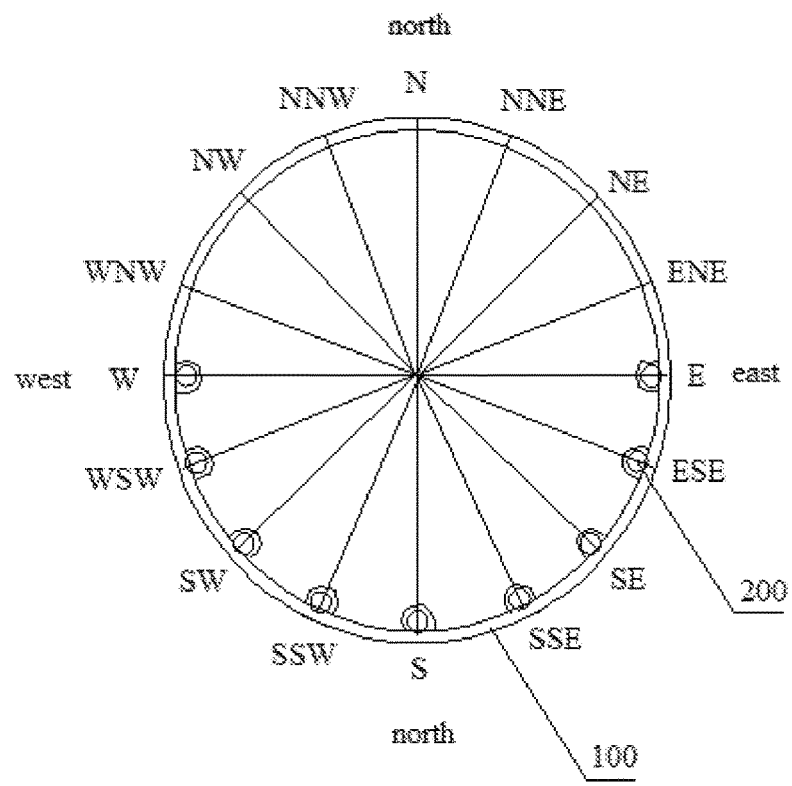

Reference is made to FIG. 5-1, which is a schematic view showing a range corresponding to a direction in which the sun radiates and a range corresponding to a direction in which a high temperature and a rainstorm may occur in summer at the place where the tower is located.

FIG. 5-1 is a representative schematic view showing diurnal change of the amount of daily radiation to which an outer circumference of the tower in summer is exposed, and is measured and drawn based on meteorological data of a natural environment where the tower of an upstanding wind power generator set is located. The change in the amount of daily radiation to which the outer circumference is exposed is shown by the dashed lines in the figure, and the radial amplitudes (lengths) of the dashed lines in various directions represent the intensities of radiation projected by the sun on the tower wall 100 in real time in corresponding (different) directions or (different) time periods. It may be seen that a position at about 60 degrees in a clockwise direction from south to west is a position where a high temperature begins to occur, and the high temperature continues to the due west side, thereafter, the intensity of radiation begins to decrease (i.e., the "western exposure" as we usually refer to). The enclosure of the tower at this geographical location at the due north side may not be directly exposed to the solar radiation during this period of time and is only exposed to the radiation from the local earth surface and the atmosphere, i.e., the environmental radiation which is very weak. That is, the shady side (including the tower wall 100, the outer surface of the tower wall 100 and the air near the outer surface) of the enclosure of the tower is equivalent to a huge cold source during this period of time.

The cold source refers to a mass body (solid, gas or liquid) which has a low temperature with respect to the surroundings and automatically absorbs the heat (or heat flow) from the object in the ambient environment, thus the cold source is worth using by dynamic bridging. Bridging refers to building a heat flow transfer channel on the way of transferring heat from the heat source inside of the enclosure to the outside of the enclosure to maximize the heat flow transfer speed. This is also the objective fact utilized by the technical inventive idea of the present application.

The drawings for the embodiments herein are generally described by taking the shady side of the enclosure located in the north as an example, which, apparently, is not intended to limit the protection scope of the present application.

Reference is further made to FIG. 5-2 which is a schematic view showing temperature sensors provided at a sunlit side of the tower. For the geographical environment where the shady side is a north side, the sunlit side is a south side. Here, the temperature sensors 200 are uniformly arranged in the east, south and west directions. In the figure, the temperature sensors 200 located at the inner wall are shown, and temperature sensors 200 are also provided at the outer wall.

When determining the relatively low temperature area as described above, the position of the shady side of the enclosure just corresponding to the irradiation direction of the solar radiation is introduced. It may be understood that, by taking FIG. 5-2 as an example, when the sun rises from the east, the solar radiation may not stay only in the due east, and the thermal radiation may further affect the position between east and north. Therefore, assuming that the sun is located in the due south, the temperature is actually not lowest at a position in the due north directly opposite to the due south, but at a position in north by west at a certain angle. A temperature sensor may be provided at an outer wall of the shady side (when there is no wind disturbance) in order to determine, according to the detected value, a deflection angle, by which the relatively low temperature area deflects from the position right corresponding to the irradiation direction of the solar radiation, thus may serve as a correction to the determined position of the relatively low temperature area determined according to the irradiation direction of the solar radiation.

The deflection angle may be used as a reference for other generator sets not provided with the temperature sensor. The deflection angle is set as a predetermined angle, after the irradiation direction of the sun is acquired, the relatively low temperature area may be determined according to the predetermined angle. The deflection angle (e.g., ranging from 3 degrees to 5 degrees) is related to the thermal diffusivity of the material from which the enclosure is made, the thickness of the wall, an equivalent diameter of the enclosure, and the intensity of the solar radiation.

The relationship between the irradiation direction of the sun and the determined relatively low temperature area of the shady side of the enclosure is discussed hereinafter by taking a position right corresponding to the irradiation direction as an example. Apparently, deflection at a certain angle is a preferable solution and adapted to the following method for determining the relatively low temperature area.

In addition, when the temperature sensor 200 is provided at the south side, the change of the temperature difference between the outer wall and the inner wall may be detected to get the delay time of heat transfer from the outer wall to the inner wall. For example, when the sun irradiates a due south side of the enclosure, it is determined that the position of the due north or north by west described above is the relatively low temperature area. Due to the delay of the radiant heat transfer in time, the relatively low temperature area may occur after the corresponding delay time (such as 15 minutes to 20 minutes). The heat source may be driven from the current position after the delay time elapses, to adjust to the relatively low temperature area corresponding to the current solar time.

As described above, the relatively low temperature area of the enclosure is determined according to the position of the surrounding flow separation or the irradiation direction of the solar radiation. In a preferable solution, the relatively low temperature area may be determined by the two factors of the surrounding flow separation and the solar radiation together.

As shown in FIG. 4-1, for the upward incoming flow coming from the southwest direction in summer, the positions where the surrounding flow separation occurs are position A (north by west) and position B (east by south) as shown in the figure, and the position of the shady side of the enclosure right corresponding to the irradiation direction of the solar radiation is position C. After the latitude and the longitude of the place where the tower as the enclosure is located are acquired, the irradiation direction of the solar radiation may be obtained by reading the time information or may be acquired by directly measuring the solar azimuth angle and elevation angle. At sunrise and at sunset, the solar elevation angle is equal to zero; at noon in a day, that is, when the local solar time is 12 o'clock, the solar elevation angle is maximum, and at this time, the sun is located in the due south or due north, that is, the solar position is equal to zero or 180 degrees.

Considering the conventional effect of the solar radiation, an overall temperature of the shady side is lower. In China, for example, in Turpan region (on the sand-gravel ground of Huoyanshan region and Toksun region), the ground temperature may be above 60 degrees Celsius in summer. There are many other hot and dry regions where the ground reflects the solar radiation to heat the air near and above the ground surface and the metal tower wall 100 is also heated directly by the solar radiation. The temperature difference between the shady side and the sunlit side of the tower wall 100 may be above 15 degrees Celsius.

Therefore, the temperature at the position of the surrounding flow separation located at or near the position A (indicated by point A in the figure, which is actually a range from 115 degrees to 125 degrees) of the shady side should be lower than the temperature in the position B. By theoretical analysis, each of the position A and the position C corresponds to a relatively low temperature area. In this case, an intermediate position between the position A and the position C (since the position of the surrounding flow separation at position A represents a range, the intermediate position selected also represents a range), that is, position D shown in the figure represents the relatively low temperature area searched by the present application. A controller of a control system acquires the position of the relatively low temperature area and controls a drive device to move the heat source to the relatively low temperature area indicated by position D, and the relatively low temperature area indicated by the position D is defined as a path along which the radial heat transfer speed of the heat flow is naturally maximized.

It may be known from the above solution that, the irradiation direction of the solar radiation changes with time, and the parameters of the airflow such as the wind direction, the wind speed, the air density and the temperature of the upward incoming flow also change randomly. Therefore, the four positions A, B, C and D all change dynamically, and then the relatively low temperature area determined by any one of the above methods may also change dynamically. Therefore, the method for driving the heat source to move to the corresponding relatively low temperature area belongs to a dynamic heat dissipation method. The present application takes advantage of the change rule between the time and space of the relatively low temperature area to dynamically adjust the heat dissipation layout, and is a pioneering solution for the heat dissipation of the heat source located inside the enclosure.

It should be noted that, for determining the position of the surrounding flow separation above, it is required to know the parameters of the airflow outside the tower. The parameters of the airflow may be acquired by the following methods.

Figures 1, 8:
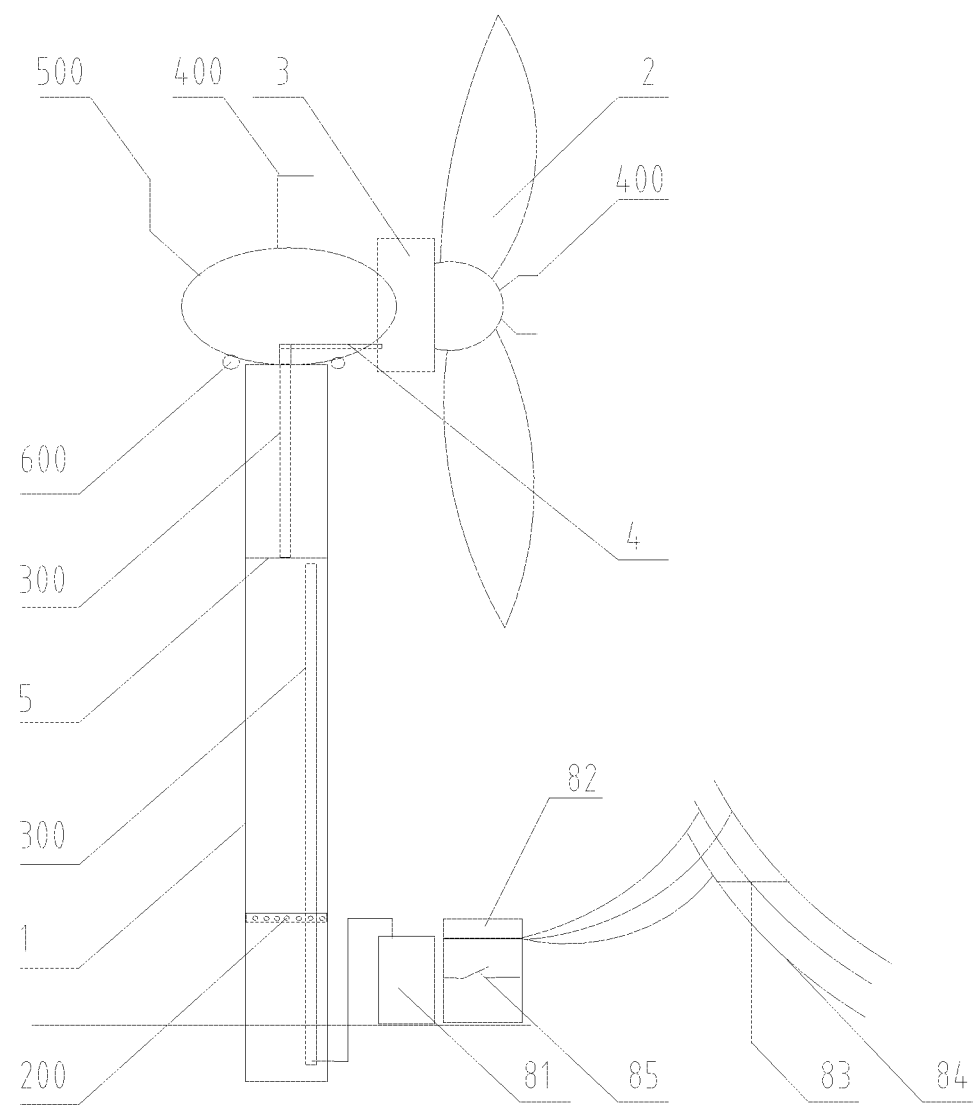
Figures 2, 8:
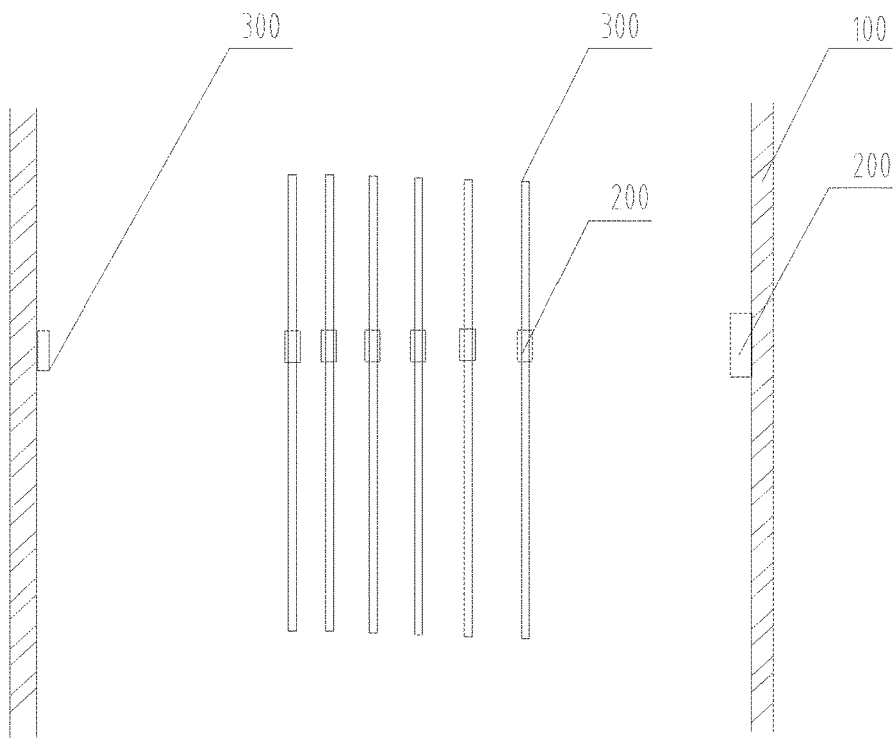

In a first method, the parameters of the airflow are obtained by detection. The dynamic heat dissipation system according to the present application includes a servo control system. The servo control system includes a parameter acquisition device and a servo controller. The parameter acquisition device is used for acquiring various parameters, in order to facilitate the servo controller obtaining the relatively low temperature area. In this case, according to the formula about the Reynolds number described above, the parameter acquisition device includes a wind direction sensor 500, a wind speed sensor 400 and a wind field air temperature sensor 600 (the air temperature is measured and obtained without being interfered by the solar radiation) as shown in FIG. 8-1, so as to calculate and obtain the position where the surrounding flow separation of the airflow outside the enclosure occurs, and the parameters of the airflow may be detected in real time.

In a second method, the parameters of the airflow (the wind direction, the wind speed, the air density and the temperature of the upward incoming flow) outside the enclosure during a corresponding period of time are acquired according to a meteorological wind rose plot of the place where the enclosure is located.

Figure 6:
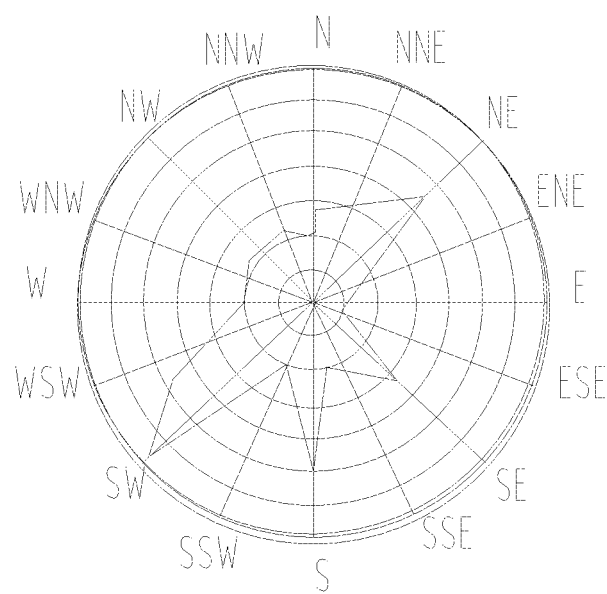
FIG. 6 is a schematic view of a wind rose plot.

Reference is made to FIG. 6 which is a schematic view of a wind rose plot.

The wind rose plot may reflect the parameters of the airflow such as the wind direction and the wind speed in the local region during a certain period of time (such as in summer from June to August), thus providing historical data for the calculation of the position where the surrounding flow separation occurs. In a corresponding geographic location, the meteorological data typically shows a certain regularity, that is, the meteorological data in different periods of time of every year may be substantially the same or change regularly. For the selection of the relatively low temperature area of the tower 1 during a period of time, the corresponding airflow parameters may be determined according to a historical meteorological wind rose plot during the corresponding period of time, thus the required position of the surrounding flow separation may also be obtained. In other words, according to the wind rose plot, a position where the incoming flow has a larger wind speed and the occurrence frequency thereof is high at a specific direction in a certain period of time may be acquired, thus reflecting the position of the surrounding flow separation that is worth using. Thus, the previously pure meteorological parameters are used to acquire the position of the surrounding flow separation, which is then used by dynamic heat source layout of the heat dissipation system.

In general, the meteorological data of a certain region may include a wind rose plot, and it is just required to acquire the wind rose plot of the place where the wind turbine tower as the enclosure is located. In addition, for a region where the meteorological data is not monitored, the meteorological data should be monitored before establishing a wind power generator set, and the meteorological data not only serves as a necessary support for the establishment of the wind power generator set, but also serves as a reference for performance improvement, for example using meteorological wind resource to the dynamically adjust the heat dissipation layout mentioned in the present application.

Theoretically, the solution in which the parameters of the airflow are detected in real time to acquire the position of the surrounding flow separation is more accurate, yet the method provided for acquiring the position of the surrounding flow separation according to the wind rose plot provides more options for a technician. When the sensor fails, the solution in which the position of the surrounding flow separation is acquired according to the wind rose plot may serve as a redundant alternative. When the sensor is not provided, the cost is relatively low accordingly. As described above, the temperature sensors for detecting the temperature of the outer wall and/or the temperature of the inner wall of the tower wall 100 or the wind direction sensor 500 here etc. may not be provided (however, for a wind turbine tower, the wind direction sensor 500 is generally provided), or may serve as reference for a tower which is not provided with the sensor, especially for towers located in the same region, and the data of one set of wind turbine tower may provide shared resources for other towers.

It is evident that, this solution is an embodiment in which the heat source is actively moved to adjust the heat dissipation layout so as to adapt to the solar radiation and the wind resources (the wind speed and the wind direction) and a potential beneficial objective law of a coupled action between the wind and the outer wall of the enclosure is used to get the heat transfer effect with heat transferred at a maximum speed under the action of the temperature difference.

Figure 7:
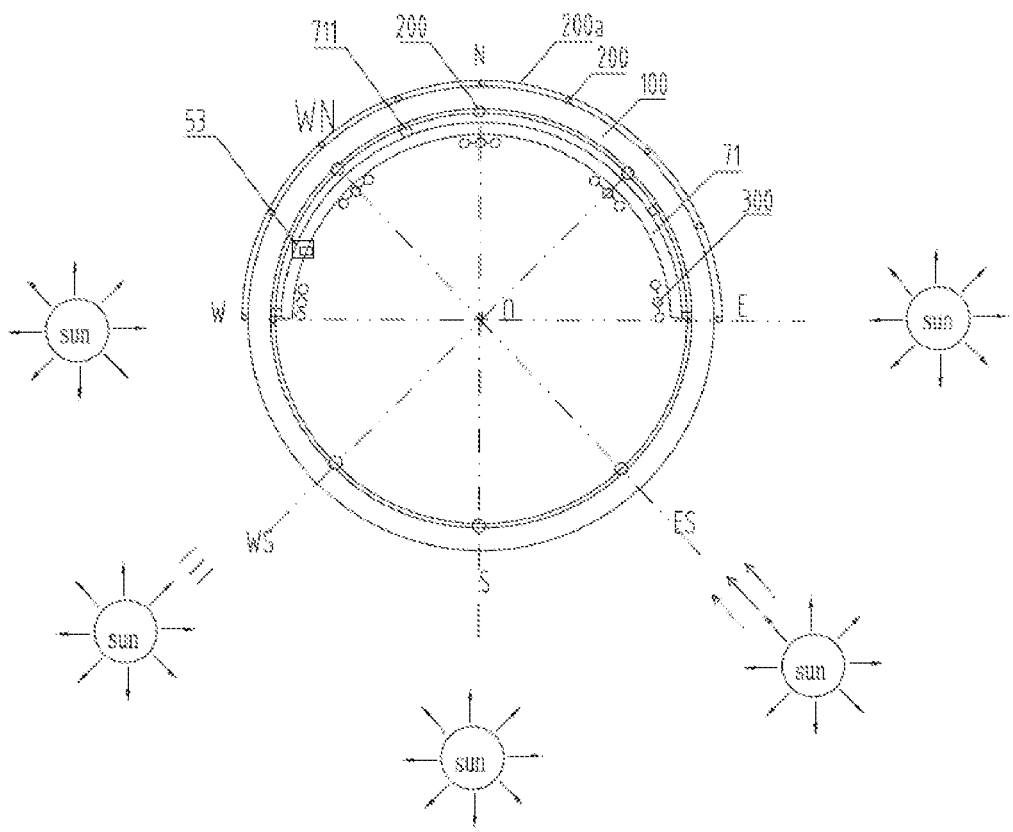
FIG. 7 is a schematic view of a tower wall carrying a circular arc-shaped track according to the embodiment of the present application.

Reference is made to FIG. 7, which is a schematic view of the tower wall with a circular arc shaped track according to an embodiment of the present application. The figure further shows the temperature sensors 200 provided on the inner wall and the outer wall of the tower wall 100.

The parameter acquisition device may further include the temperature sensors 200. As shown in FIG. 7, the temperature sensors 200 may be provided in a circumferential direction of the tower wall 100, so as to fully acquire the temperatures of the inner wall and the outer wall of the tower wall 100.

The temperature sensors 200 transmit detected data to the controller via a communication bus 200a as shown in the figure for example, so as to facilitate precise transmission and comprehensive analysis of the signal. Of course, the detected data of the temperature sensors 200 may be separately transmitted by wire or wirelessly, and the controller herein is the servo controller. Based on the detected temperature data, the controller may determine the actual relatively low temperature area. Three methods (in which the relatively low temperature area is determined based on the position of the surrounding flow separation occurring at the shady side, the position of the shady side of the enclosure right corresponding to the irradiation of the solar radiation, and the position between the two positions here, respectively) for determining the relatively low temperature area are provided as above. The actual relatively low temperature area detected here and the relatively low temperature area obtained by the above three methods may be compared and then analyzed to further verify the accuracy of the above three methods, and the three methods may be used together to verify each other.

It can be known from the above analysis that, the actual relatively low temperature area must be located between the position A and the position C as described above, and the middle position between the position A and the position C should be or close to the actual relatively low temperature area. By accumulation of the temperature data detected, the relationship between the actual relatively low temperature area and the position A and the position C may be known. After the relationship is determined, when the temperature sensors 200 are not provided or the temperature sensors 200 fail, a more accurate method for determining the relatively low temperature area may be provided merely by the wind direction sensor 500 and the wind speed sensor 400 commonly configured, and a cogent theoretical reference is further provided for the selection of the relatively low temperature area of any other tower walls 100 not provided with the temperature sensors 200.

It should be known that, the method for determining the relatively low temperature area by the temperature sensors 200 is an accurate method for determining the relatively low temperature area. However, in order to determine the relatively low temperature area within a large range, more temperature sensors 200 are required to be provided, and at least the shady side of the tower 1 should be provided with the temperature sensors 200, which undoubtedly will increase the facility cost and the maintenance cost. Therefore, the above three methods except the method for determining the relatively low temperature area by temperature detection can meet the basic accuracy requirement of the selecting the relatively low temperature area without increasing the facility cost, and can be an alternative to the method for determining the relatively low temperature area by temperature detection, and can also serve as a redundant solution.

In addition, in determining the relatively low temperature area, it is possible to detect only the temperature of the outer wall of the tower wall 100, that is, the temperature sensors 200 are only provided at the outer wall, and the heat of the heat source located inside the enclosure is transferred from the inside to the outside. The temperature of the outer wall reflects the ambient temperature around the outer wall, a position of the outer wall where the temperature is the lowest is selected as the relatively low temperature area, and a large environment around the shady side of the enclosure here may be more accurately used as a "cold source" to absorb the heat, thereby dissipating the heat. Of course, in theory, the position of the outer wall where the temperature is the lowest centripetally corresponds to a position of the inner wall where the temperature tends to be the lowest, thus it is also possible to only detect the temperature of the inner wall and select the position of the inner wall where the temperature is the lowest as the relatively low temperature area. Taking into account the influence of the heat source, such as the power transmission conductor 300 located inside the tower 1, on the temperature of the inner wall when generating heat, the temperature of the inner wall and the temperature of the outer wall may be detected at the same time to dynamically get the temperature change around the circumference of the inner wall, so as to accumulate data which reflects the relatively low temperature areas at different moments during different periods of time in different seasons and further to provide a reference for the wind turbine tower 1 of the generator set which is not provided with the temperature sensor 200.

The method for acquiring the relatively low temperature area by detecting the temperature and the method for acquiring the relatively low temperature area by obtaining the position of the surrounding flow separation described above may be performed segmentally (including measuring the wind speed segmentally) in a height direction of the tower 1. As the height of the tower 1 increases, the parameters of the airflow for example the wind speed may change, which is presented in different Reynolds numbers Re, as shown in FIG. 2-3. According to the principle that the hot air automatically rises inside the tower as the enclosure under a buoyant force, the temperatures at positions with different heights of the tower 1 may also be different. By the method for acquiring the relatively low temperature area segmentally, the change of the actual relatively low temperature area of the shady side of the tower 1 in the entire height direction may be determined more accurately.

For the power transmission conductor 300 inside the tower 1, a platform 5 is generally provided at a top of the tower 1, and a carrying bracket 51 is provided on the platform 5. The power transmission conductor 300 is located in the middle of the interior of the tower 1 after hanging down from the nacelle 20, and then the power transmission conductor 300 climbs over the carrying bracket 51 and hangs down along the inner wall of the tower 1, with a hanging length from tens of meters to over one hundred meters. In order to prevent the power transmission conductor 300 from twisting and moving with respect to a bearing surface of the carrying bracket 51 so as to avoid being worn, the bearing surface of the carrying bracket 51 may be arc-shaped, the shape thereof is similar to the shape of a saddle, thus the carrying bracket 51 may also be referred to as a saddle surface bracket, and the bearing surface 511 of the carrying bracket 51 is also referred to as a saddle surface.

As described above, the power transmission conductor 300 hangs down for tens of meters to over one hundred meters after climbing over the bearing surface 511. If there is a significant temperature difference from bottom to top in the height direction, by the method of searching the relative low temperature area segmentally, it may be ensured that each segment of the power transmission conductor 300 may be located in a relatively low temperature area corresponding to respective heights, thus achieving the best heat dissipation effect. It may be understood that, in this case, the power transmission conductor 300 is also driven segmentally.

When the relatively low temperature area is acquired segmentally, for detecting the temperature, the temperature sensors 200 may be segmentally provided at the inner wall and/or the outer wall of the tower 1 in the height direction of the tower 1 to segmentally detect the temperatures of the corresponding positions. For the parameters of the airflow required for calculating the position of the surrounding flow separation, the wind speed sensors 400 and the wind filed airflow temperature sensors 600 may also be correspondingly provided segmentally for measuring the wind speed and the temperatures at different heights. Since there is little difference among the wind directions at different heights, the wind direction sensors 500 are not necessary to be segmentally provided.

When the position of the surrounding flow separation is taken as the relatively low temperature area or as a selection factor, the position of the surrounding flow separation occurring at the shady side of the tower wall 100 is selected and the temperature sensors 200 may also be provided only at the shady side. This is mainly due to consideration of the influence of the solar radiation, even if the heat exchange efficiency is high in the position of the surrounding flow separation occurring at a non-shady side, the temperature of a surface of the enclosure is high due to exposure of the surface to the solar radiation (thus, it is not necessary to provide the temperature sensor 200 to search for the relatively low temperature area), and a relatively low temperature area is not necessarily formed on the surface of the enclosure especially during daylight hours.

It may be understood that, when it is overcast, rainy or at night, that is, when there is no sunshine, since the influence of the solar radiation may not be considered, in this case, only the position of the surrounding flow separation may be selected as the relatively low temperature area without considering the influence of the solar radiation. The two positions of the surrounding flow separation formed by the upward incoming flow may both be employed as the relatively low temperature area, and the controller may determine which of the two positions as the relatively low temperature area according to a shortest path the heat source is required to move.

The overcast, rainy weather or night described above is mainly for eliminating the influence of the solar radiation. For this, whether the solar radiation affects the selection of the relatively low temperature area or not may also be confirmed by detecting the temperature. The temperature sensors 200 may also be provided at the sunlit side of the enclosure. As shown in FIG. 4-1, when a difference between the temperature at the position of the shady side right corresponding to the irradiation direction of the solar radiation and the temperature at the sunlit side position irradiated by the solar radiation is not greater than a predetermined value (for example, the predetermined value may be set to 2 Celsius degrees), the influence of the solar radiation on the temperature may not be taken into consideration here, and the relatively low temperature area may be determined only based on the position of the surrounding flow separation occurring at the shady side. Similar to the principle discussed above, considering the cost, whether it is required to take the solar radiation as a factor for selecting the relatively low temperature area may be directly determined according to the weather or the time (daytime and nighttime). The accumulation data obtained by the temperature sensor 200 provided at the sunlit side may also be used as a reference for other generator sets.

As described in the background, in summer at Hami Prefecture at the southern slope of the Mount Tianshan in Xinjiang of China, wind often blows after 18 o'clock and the power transmission conductor 300 inside the tower 1 still generates heat. That is to say, after the solar radiation disappears periodically (temporarily for ten hours), the solar radiation absorbed by the ground still exists, and a sufficient temperature difference is generated in the height direction. The temperature difference causes the macroscopic airflow to move along the southern slope of the Mount Tianshan, the wind power generator generates power at high power, and the power transmission conductor 300 may generate a large amount of heat. Thus, in this solution, the dynamic adjustment of the heat dissipation structure may still work at night and may be performed for 24 hours a day to continuously dissipate heat, thus the adverse effect caused by heat generation of the heat source is reduced to the largest extent and a minimum cost of controlling temperature rise inside the enclosure is paid.

Of course, the adjustment may not be performed at night in this solution. For example, when a predetermined time has elapsed after sunset, the heat sources including the power transmission conductor 300 are driven to return to a position of the shady side of the tower wall 100 corresponding to the noon. The predetermined time may be 2 hours and may be set by the person skilled in the art according to climate factors of the place where the tower 1 is actually located. The predetermined time is determined according to whether the temperature difference caused by the solar radiation has disappeared or decreased significantly. Then, the heat source is driven to return to an inner wall corresponding to the position of the shady side of the enclosure, for example, a due north side. In one aspect, the temperature at the due north side is relatively low, which may satisfy certain requirements of heat dissipation at night. In addition, although a position at which the temperature is lower may exist at other positions, moving to the shady side may ensure that, the heat source may be located at the inner wall position corresponding to the position of the shady side with a low temperature rather than at any other positions where the solar radiation is relatively strong when the entire drive device or the control system fails next day, that is, instead of dynamic adjustment for 24 hours a day, a dynamic heat dissipation and control method using dynamic adjustment only during the day may be adopted.

In addition, for moving the heat source such as the power transmission conductor 300, the heat source may be driven in real time to be located in the relatively low temperature area in real time, thereby optimizing the heat dissipation effect. Or a moving cycle may be set, to allow the heat source to move to the corresponding relatively low temperature area again after a certain cycle. In this way, frequent start of the drive device may be avoided, which saves power consumption. Moreover, the influence of the solar radiation often does not change every moment and may be delayed by a certain cycle, therefore, setting the moving cycle is actually adapted to the actual change of the temperature field. Or the cycle may even be not set, and when to dynamically adjust the position of the power transmission conductor 300 or the position of any other heat source is controlled according to experience; or when it is found by detecting that the temperature of the power transmission conductor 300 or the temperature of any other heat source should not continue to increase, dynamic adjustment is performed. The time for the heat source to move is not limited herein.

The movement of the heat source mainly refers to rotation of the heat source along the tower wall 100, which is described briefly here. The heat source is moved from a due west side when the sun rises in the morning, after 12 hours, the heat source is moved to a due east side at night. The heat source is moved by an angle of 180 degrees in 12 hours (720 minutes), and the movement angular speed is 0.25°/min. Therefore, the movement is actually silent, and is extremely difficult to be perceived, which does not affect operation of the interior of the tower 1, and also does not damage the power transmission conductor 300, thus ensuring high safety.

In order to save electric energy, when setting the cycle, for the power transmission conductor 300, the cycle may be set to 20 minutes to 30 minutes, i.e., continuous movement (or rotation) is performed at an interval of 20 minutes to 30 minutes. This cycle may ensure the power transmission conductor 300 to move to the relatively low temperature area timely, and one movement covers an angle ranging from only 5 degrees to 7.5 degrees, and the angle is still small.

Whether the heat source is moved in real time or moved periodically and intermittently, or moved non-periodically and intermittently, moved all day or moved during different periods of time (such as moved during the day and not moved at night), the timing of the movement may be further determined to allow the power transmission conductor 300 to move for dissipating the heat dynamically when the power transmission conductor 300 really needs to be moved.

Reference is made to FIG. 8-1 and FIG. 8-2, FIG. 8-1 is a schematic view of a tower of a wind power generator grid-connected to the electric power according to the embodiment of the present application, and FIG. 8-2 is a schematic view showing the structure of the power transmission conductor 300 provided with the temperature sensors 200 according to the embodiment of the present application.

As shown in FIG. 8-1, blades 2, a wind power generator 3 and an electric energy output and transmission conductor 4 are provided at the top of the tower 1. The blades 2 absorb wind power. The wind power generator 3 generates power using the wind power. The electric energy from the wind power generator 3 is output and transmitted by the electric energy output and transmission conductor 4. The electric energy output and transmission conductor 4 is connected to the power transmission conductor 300. A lower end of the power transmission conductor 300 is connected to a grid-connected transformer 81, and is connected to a power grid 84 via the grid-connected transformer 81 and a power transmitter 82. The power grid 84 is laid on a grid-side transmission pole 83 or a tower structure. The grid-connected transformer 81 has a grid-side switch 85. When the grid-side switch 85 is closed, the power transmission conductor 300 is in a state of transmitting the electric power, that is, in operation, and may generate heat, becoming a heat source, and at this time heat dissipation is required. Therefore, that the grid-side switch 85 is in a closed state with power output may be used as a starting signal for operating the control system. The control system starts to search the relatively low temperature area and controls the drive device to drive the power transmission conductor 300 to move to the relatively low temperature area, as shown in FIG. 4-3.

Besides the above condition, the start of the control system may be determined according to the temperature difference between the power transmission conductor 300 and the outer wall of the tower wall 100. As shown in FIG. 8-2, the temperature sensor 200 may be provided on each of the power transmission conductors 300. The temperature of the power transmission conductor 300 is detected, and then compared with the detected temperature of the outer wall of the tower wall 100 by a temperature comparator (which may be built in the controller). When the temperature of the power transmission conductor 300 is greater than the temperature of the outer wall by a predetermined temperature difference, the dynamic heat dissipation system may be started. The predetermined temperature difference may be set to, for example, 2 Celsius degrees.

A solution in which the control system and the drive device are started after both the two conditions described above are satisfied is the best solution. When the power transmission conductor 300 is in a state of transmitting the current to generate heat, due to the weather, it is likely that the outside temperature is not lower than the temperature of the power transmission conductor 300. When the power transmission conductor 300 is switched from an operation state to a normal shutdown state or an overhauled state, the temperature of the power transmission conductor 300 may last for a period of time (the practice shows that the temperature may not decrease obviously in 4 hours to 5 hours), the temperature of the outer wall may also be lower than the temperature of the power transmission conductor 300 by about 4 degrees Celsius to 5 degrees Celsius. In the above case, there is no urgent demand for heat dissipation in fact, therefore the dynamic heat dissipation system may be started only when the power transmission conductor 300 is in operation to generate heat and the temperature of the outer wall is lower than the temperature of the power transmission conductor 300.

In addition, when the surface temperature of the power transmission conductor 300 is detected, it is also possible to compare the temperatures of the power transmission conductor 300 before and after the power transmission conductor 300 is moved to the relatively low temperature area. When the temperature drop is not greater than a predetermined profit value, the power transmission conductor 300 is stopped to be driven to continue to move. The predetermined profit value is set according to the actual situation. For example, when the temperature of the internal environment of the tower is low and the power transmission conductor 300 does not operate under a high load, the predetermined profit value may be set relatively large (when the temperature drop caused by the movement is large, the movement is necessary). When the temperature of the internal environment of the tower is high and the power transmission conductor 300 operates under a high load, the predetermined profit value may be set relatively low (although the temperature drop caused by the movement is low, the movement is still necessary). That is, after the power transmission conductor 300 is moved to the relatively low temperature area, if the temperature of the surface of the power transmission conductor 300 does not decrease significantly, the power transmission conductor 300 may stop continuing to move, thereby saving the energy.

When the predetermined profit value is set, the surface of the power transmission conductor 300 may be divided into multiple areas according to the temperature of the surface, with higher temperature areas corresponding to lower predetermined profit values.

The surface of the power transmission conductor 300 may be divided according to temperature loads of the power transmission conductor 300. For example, when the temperature of the surface of the power transmission conductor 300 is preferably not greater than 50 Celsius degrees, the surface of the power transmission conductor 300 may be divided into three areas: an area above 50 Celsius degrees, an area from 10 Celsius degrees to 50 Celsius degrees, and an area below 10 Celsius degrees.

Correspondingly, in the case that the surface temperature of the power transmission conductor 300 is above 50 Celsius degrees, the predetermined profit value may be set to be 0.2 Celsius degrees, that is, if the temperature drop before and after moving to a low temperature area is above 0.2 Celsius degrees, movement of the power transmission conductor 300 is worth considering, otherwise movement is not considered. In the case that the surface temperature of the power transmission conductor 300 ranges from 10 Celsius degrees to 50 Celsius degrees, after the power transmission conductor 300 is moved to the low temperature area, if the temperature drop reaches 0.5 Celsius degrees or above, the power transmission conductor 300 is moved, otherwise, the power transmission conductor 300 is not moved. In the case that the surface temperature of the power transmission conductor 300 is below 10 Celsius degrees, and is actually in a low temperature state, the movement is worth utilizing when the temperature drop caused by the movement is relatively large. Therefore, the predetermined profit may be set to 1 Celsius degree, and the movement may be performed only when the predetermined profit value is reached or exceeded, otherwise, the movement is stopped.

After the movement is stopped, for periodical drive control, the power transmission conductor 300 may be driven in a next cycle, or the drive control may be started by manual control, or may be re-driven according to changes in the external environment, etc.

The above control of the dynamic movement takes both the heat dissipation cost and the heat dissipation requirement into account. It may be known that, the above accumulated data may serve as a reference for this generator set or other generator sets subsequently. When the surface temperature areas of the power transmission conductors 300 are the same and the external environment conditions are similar, it is possible to directly determine whether to drive or stop driving the power transmission conductor 300 without monitoring the change of temperature difference of the surface of the power transmission conductor 300.

A contact temperature sensor may be used as the temperature sensor 200 for detecting the power transmission conductor 300 and the temperature sensors at other positions. A surface, which is a non-contact part and exposed to the outside, of a temperature sensing member of the sensor may be performed with heat insulation treatment to form a thermal insulation layer, thereby isolating the surface in non-contact and exposed to the outside from thermal radiation of the surrounding space. Thus, in one aspect, the direct irradiation of the solar radiation is isolated, and in another aspect, the heat in contact with a contact part of the temperature sensing member is also prevented from being dissipated to the outside, thereby effectively preventing detection of temperature value from being disturbed.

The methods for acquiring the relatively low temperature area, the start and control of the dynamic heat dissipation system etc. are described hereinabove. How to move the heat source towards the relatively low temperature area is further described hereinafter, and accordingly, the structure and configuration of the drive device will be concretely illustrated by example.

Figures 1, 9:
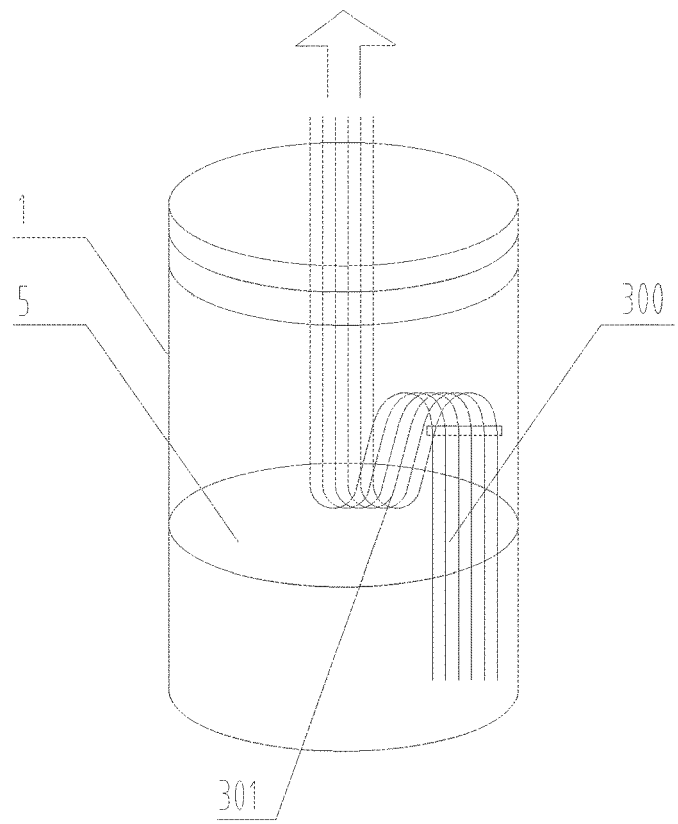
Figures 2, 9:
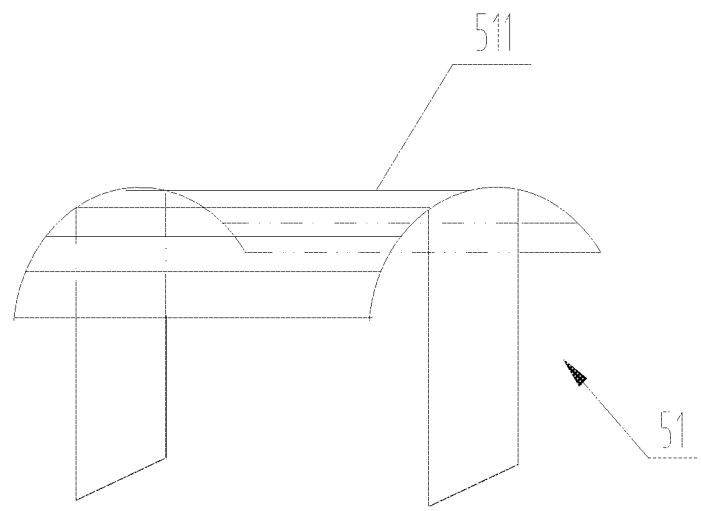

First, reference is made to FIG. 9-1 and FIG. 9-2. FIG. 9-1 is a schematic view showing a typical laying solution of the power transmission conductor inside the tower. FIG. 9-2 is a schematic view showing the structure of the carrying bracket in FIG. 9-1.

The power transmission conductor 300 passes through a base platform via a bottom of the nacelle located at the top of the tower 1 to enter into a reference plane at the top of the tower 1. The nacelle and the interior thereof may yaw integrally, which causes the power transmission conductor 300 also to twist to-and-fro. Thus, a platform 5 is provided inside the tower 1. The platform 5 can be used for transportation of devices and may provide a rest place, and so on. A carrying bracket 51 is arranged at an upper part of the tower 1 and on the platform 5. The power transmission conductor 300 hangs from the top of the tower 1 and is carried on a bearing surface 511 of the carrying bracket 51, forming an arc-shaped hanging segment 301. The arc-shaped hanging segment 301 hangs from the carrying bracket 51 and then is located close to the inner wall of the tower 1. The torsion of the power transmission conductor 300 above the bearing surface 511 is cut off at the arc-shaped hanging segment 301, and a portion of the power transmission conductor 300 below the carrying bracket 51 does not twist. The mobile power transmission conductor 300 in this solution also mainly refers to the portion of the power transmission conductor 300 below the bearing surface 511.

Figure 10:
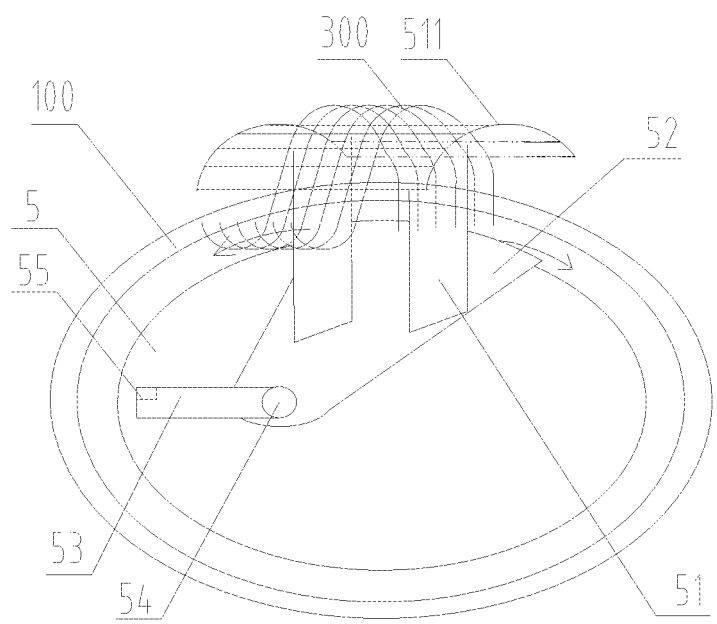
FIG. 10 is a schematic view showing the structure of a servo drive system for the carrying bracket according to an embodiment of the present application.

Reference is made to FIG. 10, which is a schematic view showing the structure of a servo drive system for the carrying bracket according to the embodiment of the present application.

For the bearing way of the bearing surface 511 in the conventional technology, in order to drive the power transmission conductor 300 to move to the relatively low temperature area for dissipating heat dynamically, in this solution, the carrying bracket 51 is driven to rotate to driven the power transmission conductor 300 carried on the bearing surface 511 and the power transmission conductor 300 below the bearing surface 511 to move to the relatively low temperature area.

As shown in FIG. 10, in order to facilitate driving the carrying bracket 51 to rotate, a rotating plate 52 is also provided on the platform 5. The carrying bracket 51 is arranged on the rotating plate 52. The rotating plate 52 is driven to rotate in order to drive the carrying bracket 51 to rotate. The rotating plate 52 may be arranged in a fan-shaped structure shown in the figure. A drive device for driving the rotating plate 52 to rotate may be defined as a first drive unit 53 including a servomotor. The rotation speed of the servomotor is often high, thus a speed reducer may further be provided. A first output shaft 54 of the first drive unit 53 is connected to the rotating plate 52 for driving the rotating plate 52 to rotate. When the speed reducer is provided, the first output shaft 54 is an output shaft of the speed reducer. The fan-shaped rotating plate 52 may rotate around a small arc-shaped end of the fan-shaped rotating plate 52.

If the fan-shaped rotating plate 52 is provided, the area of a large arc-shaped segment of the fan-shaped rotating plate 52 is large, which thus facilitates the mounting of the carrying bracket 51, and the overall volume of the rotating plate 52 may not be large, such that the motor is easy to drive. It may be understood that, the rotating plate 52 here is apparently connected to the platform 5 rotationally or connected to the first output shaft 54 directly, as long as the rotating plate 52 can rotate, the shape of the rotating plate 52 is not limited to the fan shape described above. In addition, even if the rotating plate 52 is not provided, but a track along which the carrying bracket 51 rotates is provided on the platform 5, it is also possible to drive the rotating plate 52 by the first drive unit 53 to move along the track.

Further effect is obtained by providing the rotating plate 52, for example, any other heat sources for example the transformer, an electrical control cabinet and other electrical devices may be placed on the rotating plate 52, and a power unit such as a hydraulic station for a hydraulic control system may also be placed on the rotating plate 52. The carrying bracket 51 is mainly used for carrying the power transmission conductor 300, despite the rotating plate 52 may have redundant space after mounting the carrying bracket 51. For the heat source which may be rotated and generate heat, apparently, the heat source may rotate along with the rotating plate 52, the heat source may be placed close to the inner wall of the tower wall 100, so as to be close to the relatively low temperature area, thus synchronous heat dissipation of the heat source with the power transmission conductor 300 is achieved.

The carrying bracket 51 here is mainly provided for the power transmission conductor 300. It may be understood that, for other heat sources, especially for the heat source which is not suitable to be directly driven to move or in the case that there are multiple types of heat sources, a special bearing component may also be provided to bear the heat source, and the bearing component is driven to move to drive the heat source on the bearing component to move. In addition, the power transmission conductor 300 is not limited to being provided inside the tower 1. In another case that the power transmission conductor 300 is provided and a part of the power transmission conductor 300 is required to be twisted while remaining parts of the power transmission conductor 300 are not required to be twisted, the carrying bracket 51 may be provided.

The length of the portion of the power transmission conductor 300 below the carrying bracket 51 is generally large. In addition to being driven by the carrying bracket 51 to rotate, the portion of the power transmission conductor 300 below the bearing surface 511 may be driven by the drive device to rotate with the carrying bracket 51 synchronously.

Figure 11:
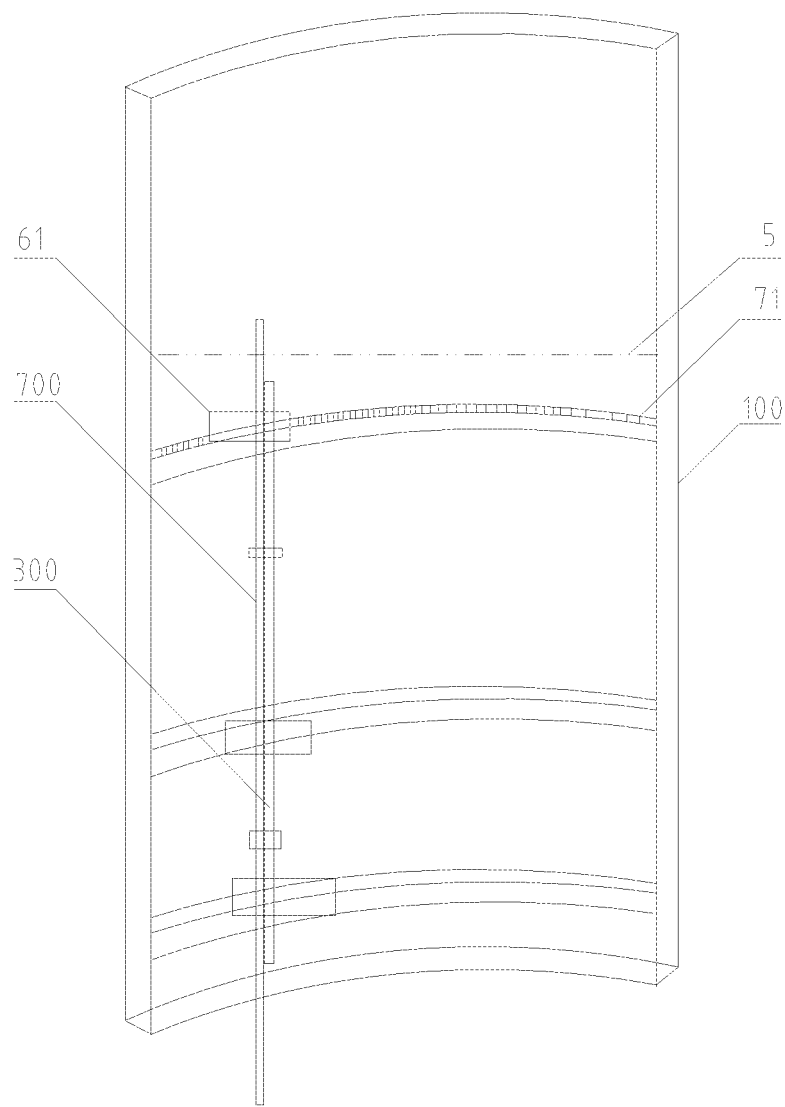
FIG. 11 is a schematic view showing the structure of the tower wall carrying the circular arc-shaped track and a servo drive system for driving the power transmission conductor to rotate according to an embodiment of the present application.

Reference is made to FIG. 11, which is a schematic view showing the structure of the tower wall carrying the circular arc-shaped track and a servo drive system for driving the power transmission conductor to rotate according to an embodiment of the present application.

An arc-shaped track 71 is provided at the inner wall of the tower wall 100, and the portion of the power transmission conductor below the bearing surface 511 is also driven by a drive device to move. The drive device for driving the power transmission conductor is the same as the drive device for driving the carrying bracket 51, also including a motor and a speed reducer, and may be defined as a second drive unit 61 which has a second output shaft 62. When the speed reducer is provided, the second output shaft 62 is an output shaft of the corresponding speed reducer. When the power transmission conductor 300 is positioned with respect to the second drive unit 61, the power transmission conductor 300 may be driven to move when the second drive unit 61 rotates along the arc-shaped track 71.

In FIG. 11, multiple arc-shaped tracks 71 may be provided segmentally in the height direction of the tower wall 100. Correspondingly, multiple drive devices are provided to segmentally tow the power transmission conductor 300 to move. In this way, in one aspect, as described above, the relatively low temperature areas may be differently distributed in the height direction (not necessarily on the same vertical line), and each segment of the power transmission conductor 300 may be moved to the relatively low temperature area at a corresponding height by being segmentally towed. In this case, each segment of the power transmission conductor 300 is required to have a certain redundant length so as to allow circumferential displacement between an upper segment and a lower segment thereof. In another aspect, the length of the portion of the power transmission conductor 300 below the bearing surface 511 is relatively large, compared with being dragged by the carrying bracket 51, the portion of the power transmission conductors 300 below the bearing surface 511 is also towed segmentally in synchronism, thus swing of the power transmission conductor 300 may be restrained, which allows the entire power transmission conductor 300 to move to the relatively low temperature area more stably and reliably and also reduces the power requirements of the rotation driven device for the carrying bracket 51.

A controller of the control system may be provided on the platform 5, so as to allow the controller to output a control signal to the first drive unit 53 which drives the carrying bracket 51 to rotate and to the second drive portion 61 which tows the power transmission conductor 300 segmentally according to the relatively low temperature area acquired and a current position of the power transmission conductor 300.

The carrying bracket 51 is driven to rotate together with the portion of the power transmission conductor 300 below the bearing surface 511 in the above method, to prevent the power transmission conductor 300 from affecting the portion of the power transmission conductor 300 above the bearing surface 511 during rotation.

It may be understood that, the carrying bracket 51 may not move. For example, the power transmission conductor 300 may be positioned on the bearing surface 511, and then only the portion of the power transmission conductor 300 below the bearing surface 511 is towed by the drive device to move. In this case, an arc-shaped hanging segment may be provided between the portion of the power transmission conductor 300 below the bearing surface 511 and the drive device, so as to prevent a portion of the power transmission conductor 300 positioned on the bearing surface 511 from being towed. This method for moving the power transmission conductor 300 is simpler without requiring to drive the carrying bracket 51. Apparently, the method for moving the power transmission conductor 300 by driving the carrying bracket 51 may be more flexible and may allow movement within a large range, for example, allow the rotation along the tower wall 100 by approximately 360 degrees without affecting the portion of the power transmission conductor 300 above the bearing surface 511.

In this solution, a traction cable may be further provided for positioning the power transmission conductor 300. The traction cable may be a steel wire rope 700 or a braided strap or the like. The traction cable rotates synchronously with the carrying bracket 51 and the power transmission conductor 300. The traction cable is secured to the power transmission conductor 300. By taking the steel wire rope 700 as an example, when an upper end of the steel wire rope 700 is secured with respect to the carrying bracket 51, the steel wire rope 700 may rotate synchronously with the carrying bracket 51. Securing here is described in a relative sense, the steel wire rope 700 may be directly secured to the carrying bracket 51, or may be secured to the rotating plate 52. The upper end of the steel wire rope 700 may also be secured to the platform 5 and slidably connected to the platform 5, and then the steel wire rope 700 may rotate synchronously with the power transmission conductor 300 and slide along the platform 5 accordingly.

Whether the steel wire rope 700 is secured to the carrying bracket 51 or the rotating plate 52 or slidably connected to the platform 5, the direct effect is that the steel wire rope 700 is hung on the platform 5, and the power transmission conductor 300 is secured to the steel wire rope 700, thus most of the weight of the power transmission conductor 300 may be carried by the steel wire rope 700. The second servomotor 61 moving along the arc-shaped track 71 only needs to tow the steel wire rope 700 and the power transmission conductor 300 circumferentially, which may reduce the requirement of weight lifting. In this way, the motor may be embodied as a motor with a low power of 2 Kw to 3 Kw, thus the power consumption is smaller, such that the power consumption of the heat dissipation solution is further reduced there is almost no noise, thereby achieving green heat dissipation.

Figures 1, 13:
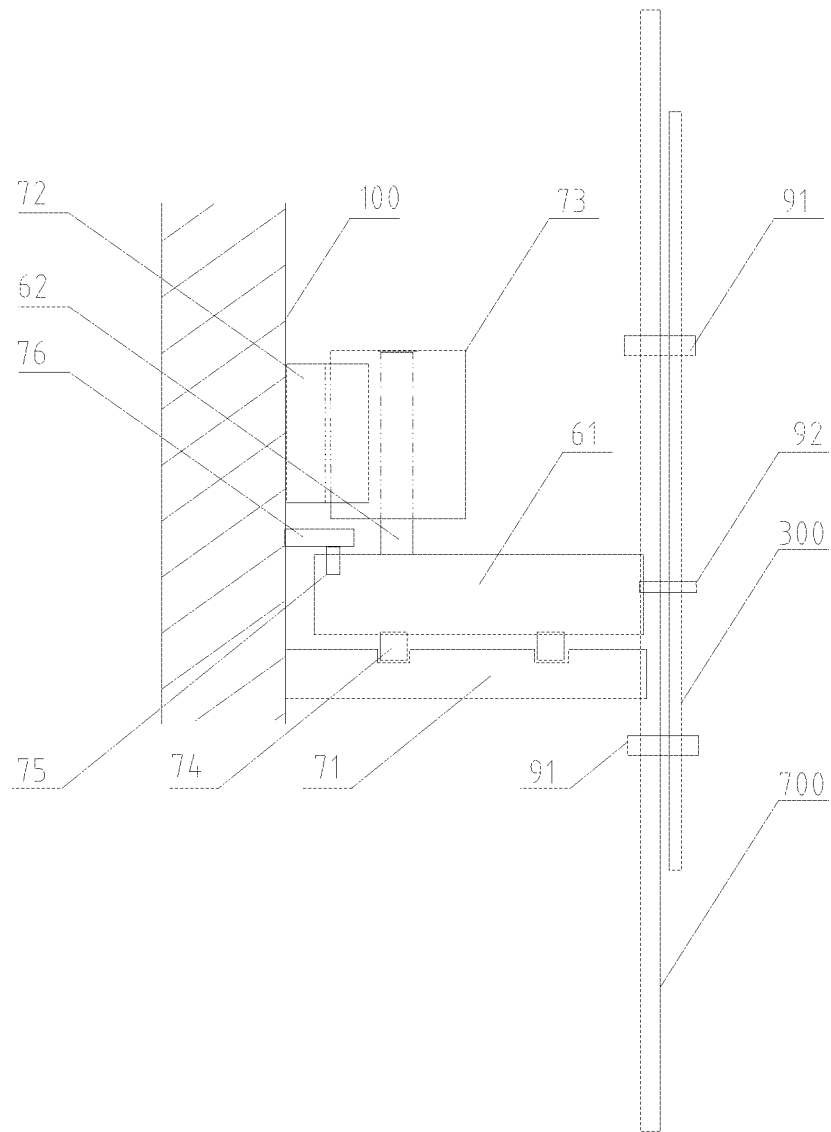
Figures 2, 13:
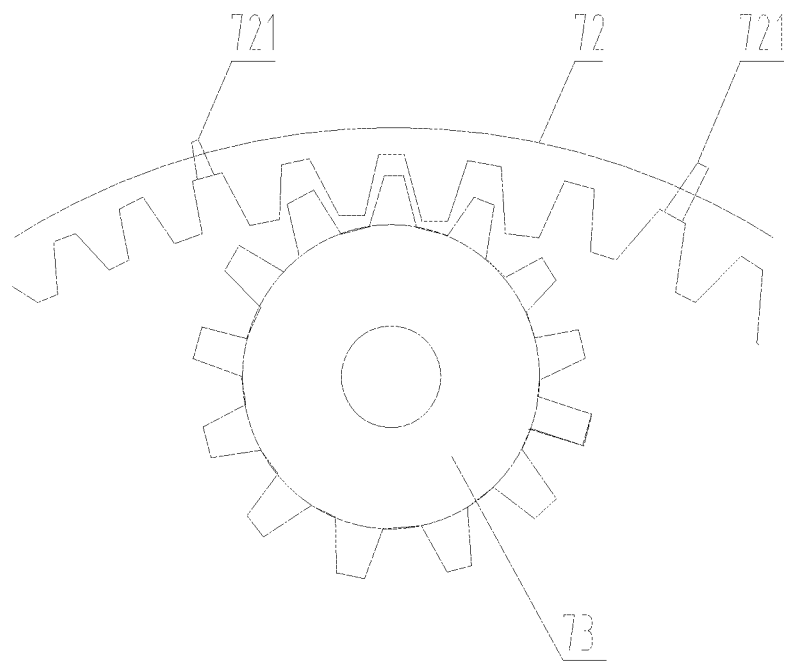
Figures 3, 13:
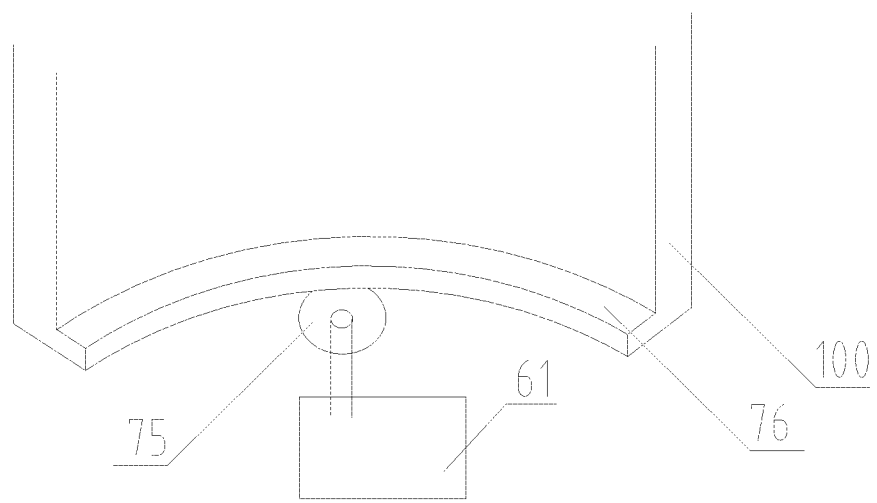

The steel wire rope 700 is segmentally secured to the power transmission conductor 300. The securing positions may correspond to the positions of the multiple arc-shaped tracks 71 and the position of the second servomotor 61. At the corresponding positions, the steel wire rope 700 and the power transmission conductor 300 are secured to the drive device by a clamping member 92 (as shown in FIG. 13-1). The number of the fixing positions may be further increased, i.e., the steel wire rope 700 and the power transmission conductor 300 may further be secured by a locking clip 91 between two drive devices to further improve the stability of falling of the power transmission conductor 300.

Figure 12:
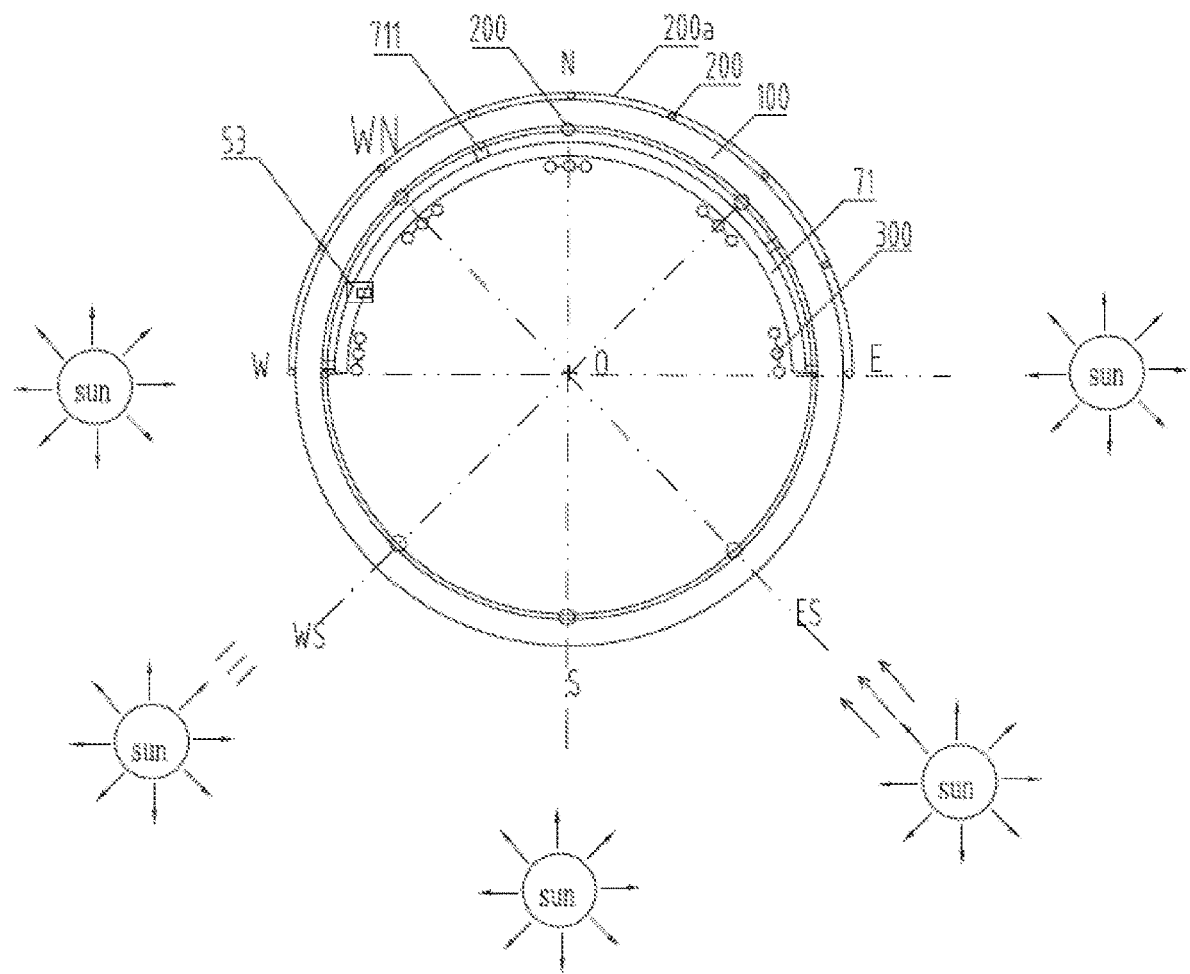
FIG. 12 is a schematic view of the tower wall carrying a circular arc-shaped track according to another embodiment of the present application.

As shown in FIG. 12 to FIG. 13-3, FIG. 12 is a schematic view of the tower wall carrying a circular arc-shaped track according to another embodiment of the present application, FIG. 13-1 is a schematic view showing the structure of the drive device in FIG. 12 moving along the tower wall, FIG. 13-2 is a schematic view of a gear and an arc-shaped rack in FIG. 13-1 in cooperation with each other and is a top view of FIG. 13-1, and FIG. 13-3 is a schematic view of a circular arc-shaped support and a support wheel in FIG. 13-1 in cooperation with each other.

In FIG. 13-1, the motor is moved along the arc-shaped track 71 by a rack 72 and a gear 73. The arc-shaped rack 72 is provided at the inner wall of the tower wall 100. The second drive unit 61 is provided with the gear 73 which may be engaged with the second drive unit 61. The gear 73 may be provided at a top of the second drive unit 61 and connected to the second output shaft 62 of the second drive unit 61 (directly connected to the output shaft of the servomotor or indirectly connected to the output shaft of the servomotor via a speed reducer). The arc-shaped rack 72 is provided above the second drive unit 61, and the arc-shaped rack 72 is engaged with the gear 73 in a radial direction of the tower 1.

A running roller 74 is provided at a bottom of the second drive unit 61, and the running roller 74 rolls horizontally along the arc-shaped track 71. In FIG. 13-1, the arc-shaped track 71 is provided with two arc-shaped grooves, and two running rollers 74 are embedded in the arc-shaped grooves to roll. The running rollers 74 cause a small rolling friction force, which facilitates smooth movement of the drive device. However, it should be noted that, the second drive unit 61 is not limited to moving by providing the running rollers 74, for example, the second drive unit 61 may slide along the arc-shaped track 71 by providing a sliding track.

When the second drive unit 61 is in operation, the second output shaft 54 drives the gear 73 to rotate. Since the gear 73 is in engaged with the arc-shaped rack 72, the entire drive device may be driven to roll along the arc-shaped track 71, and accordingly the steel wire rope 700 and the power transmission conductor 300 connected to the entire drive device are driven to rotate, so as to move to the relatively low temperature area.

A measurement sensor for measuring a circumferential position of the inner wall of the tower wall 100 may be provided on the second drive unit 61, for detecting the current position and sending the current position to the controller. The second drive unit 61 stops operating after the power transmission conductor 300 is moved to the required relatively low temperature area. Therefore, the second drive unit 61 is started and stopped according to a signal indicating the relatively low temperature area acquired by the controller, forming as a servo drive system for driving the heat source to move.

Figures 1, 14:
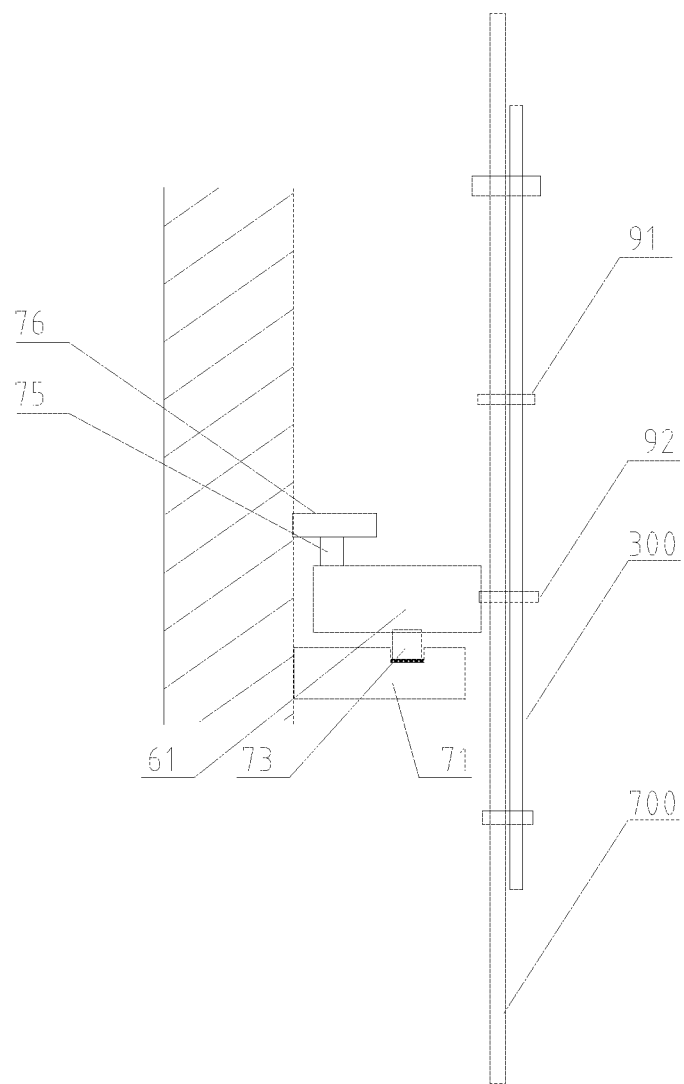
Figures 2, 14:
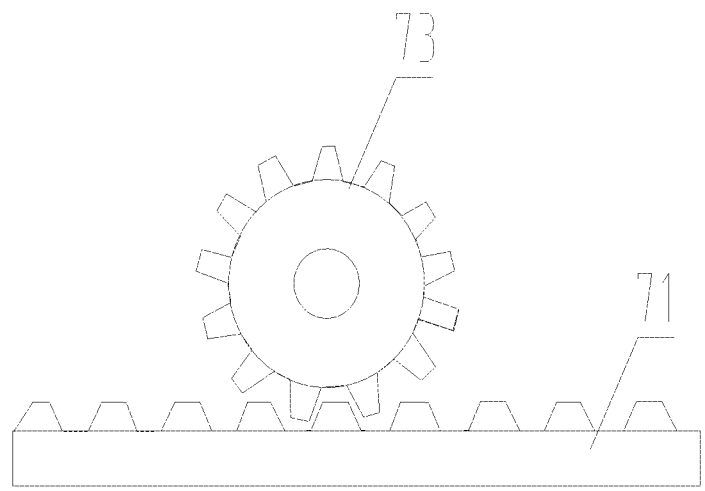
Figures 3, 14:
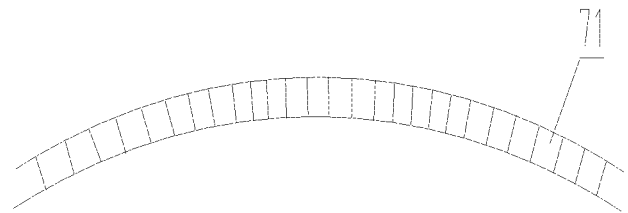

For the structural arrangement for realizing the movement along the arc-shaped track 71, reference may also be made to FIG. 7 in conjunction with FIG. 14-1 to FIG. 14-3. FIG. 14-1 is a schematic view showing the structure of the drive device in FIG. 7 moving along the tower wall. FIG. 14-2 is a schematic view of the gear 73 and the arc-shaped rack 72 in FIG. 14-1 in cooperation with each other and is a top view of FIG. 14-1. FIG. 14-3 is a schematic view of an arc-shaped support and a support wheel in FIG. 14-1 in cooperation with each other.

In this arrangement, the arc-shaped track 71 is provided with the arc-shaped rack 72. The arc-shaped rack 72 may be mounted on the arc-shaped track 71 or integrally formed with the arc-shaped track 71. The gear 73 connected to the second output shaft 62 of the second drive unit 61 is located at a bottom of the second drive unit 61, and the gear 73 is engaged with the arc-shaped rack 72 in a vertical direction. After the second drive unit 61 is started, the gear 73 moves horizontally along the arc-shaped rack 72 located on the arc-shaped track 71, thereby driving the steel wire rope 700 and the power transmission conductor 300 to move.

In the above two arrangements, an arc-shaped support 76 may be provided at the inner wall of the tower wall 100. The drive device (a motor, or the motor and a speed reducer) is located between the arc-shaped support 76 and the arc-shaped track 71. A support wheel 75 is provided on the second drive unit 61. As shown in FIGS. 13-3 and 14-1, when the second drive unit 61 moves along the lower arc-shaped track 71 located below the second drive unit 61, the support wheel 75 located above the second drive unit 61 moves along the arc-shaped support 76. The position of the second drive unit 61 is limited between the arc-shaped support 76 and the arc-shaped track 71, thus has a more stable structure, preventing the gear 73 from being disengaged from the arc-shaped rack 72 and/or preventing the rollers from being disengaged from the arc-shaped track 71.

It may be understood that, the upper-lower order of the arc-shaped support 76 and the arc-shaped track 71 is not limited, as long as the position of the second drive unit 61 is limited between the arc-shaped support 76 and the arc-shaped track 71, the stability may be increased. Of course, in view of the running load, the arc-shaped track 71 may be provided at the lower side and have a certain radial extension length, to ensure that the second drive unit 61 is able to move on the arc-shaped track 71. The arc-shaped support 76 mainly prevents upward separation and is not required to have a bearing capability. The arc-shaped support 76 has a relatively low design requirement. As shown in FIGS. 13-1 and 14-1, the arc-shaped support 76 has a smaller radial length with respect to the arc-shaped track 71.

As shown in the figure, each of the arc-shaped support 76, the arc-shaped track 71 and the arc-shaped rack 72 may be connected and secured to the tower wall 100 by connectors, such as a track connector 711 and a rack connector 721 shown in the figure, and may also by other conventional connection methods such as welding.

The tower 1 typically has a cylindrical tower wall 100. Therefore, when the drive power transmission conductor 300 is driven to move, the power transmission conductor 300 is driven by the arc-shaped track 71, the arc-shaped rack 72 and the like shown in the above embodiment to rotate along the arc-shaped inner wall of the tower wall 100. According to the requirements of movement and control, the power transmission conductor 300 does not necessarily be required to move along the circumference of the inner wall of the entire tower wall 100. Therefore, only a semicircular arc-shaped track is shown in FIG. 7, that is, the power transmission conductor 300 may generally move only along the semicircular arc-shaped track to which the shady side corresponds. Of course, a circular arc-shaped track may also be provided to make the dynamic heat dissipation system more flexible. In this case, the platform 5 for the bearing surface 511 may be connected to the tower 1 only at one position to be supported, thereby avoiding interference. The arc-shaped track 71 is provided and the drive device moves along the arc-shaped track 71, substantially along the inner wall of the tower wall 100, thus no other space may be occupied, which is a preferred technical solution.

It may be understood that, whether the tower 1 is arc-shaped or not, the power transmission conductor 300 is actually not limited to moving along an arc-shaped trajectory, for example, the power transmission conductor 300 may move along a trajectory in the shape of a straight line, a curve, a fold line, or the like. Correspondingly, the rack, the track and the support may not be arc-shaped, and may also be in the shape of a straight line. Besides being the servomotor, the drive device may be a power mechanism such as a motor.

As described previously, the relatively low temperature area is mainly searched at a position of a circumferential wall of the tower 1 and other similar enclosures. In fact, from the basic idea of the present application, the different kinds of enclosures are not limited to this. For example, the relatively low temperature area may also be a top or a bottom area, depending on the specific structure and the specific operation environment. Besides the tower 1, the enclosure may alternatively be a building exterior wall of a television tower, a housing of a water surface vehicle or an underwater vehicle, or a housing of an aviation vehicle, or the like. By taking the aviation vehicle as an example, when the aviation vehicle flies in air, some flight routes may cause one side of the nacelle to be exposed to the solar radiation for a long time, thus a high temperature rise is caused, fuel inside a fuel tank located at this side correspondingly has a high temperature rise, which is not good for safe operation. Based on the idea of this solution, the fuel inside the fuel tank may be driven to move to a relatively low temperature area, specifically, a hydraulic pump may be used to transport the fuel inside the fuel tank. With respect to luggage, goods and passengers carried, the movement of the fuel will not affect the balance, thus improving the safety factor.

Figures 1, 15:
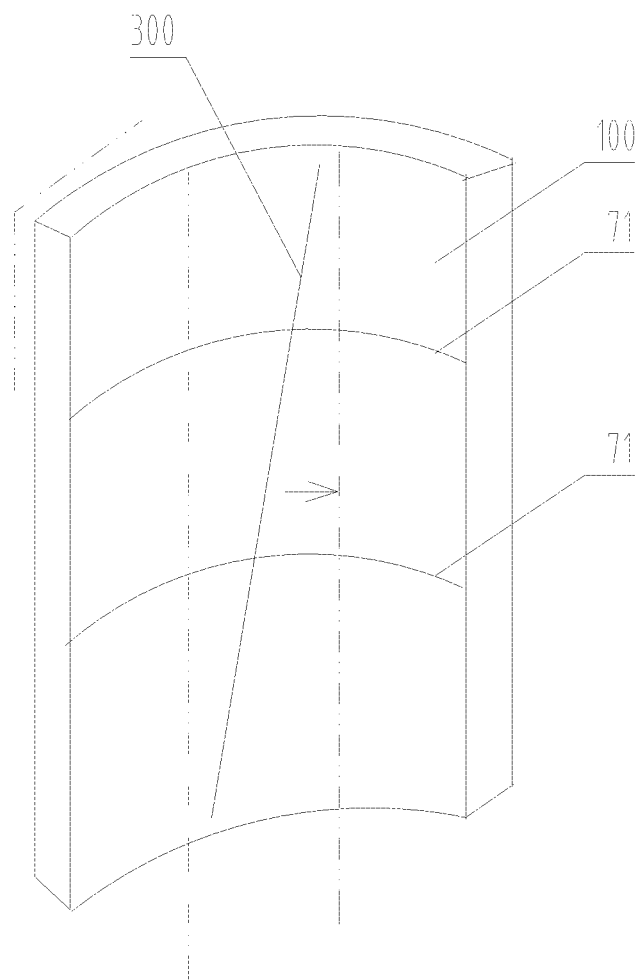
Figures 2, 15:
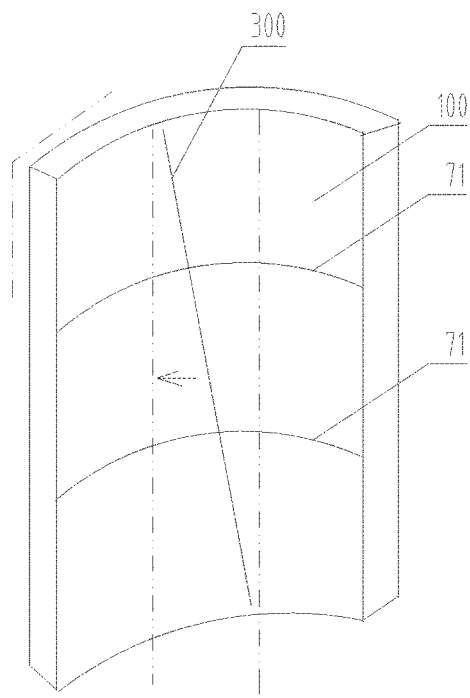
Figures 3, 15:
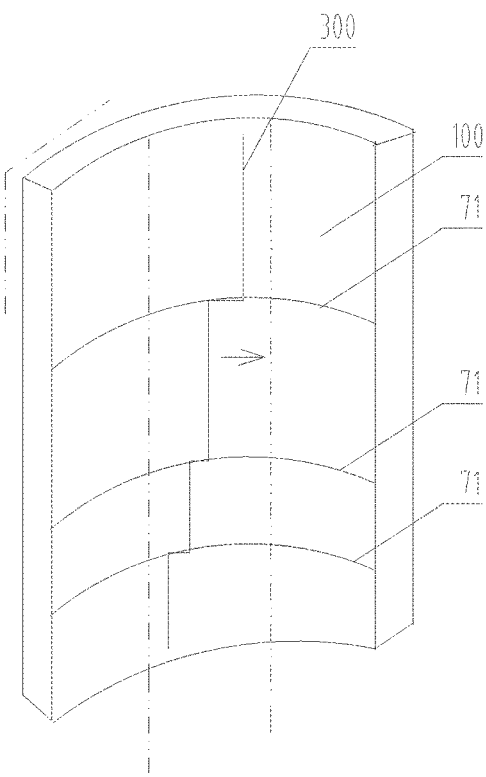
Figures 4, 15:
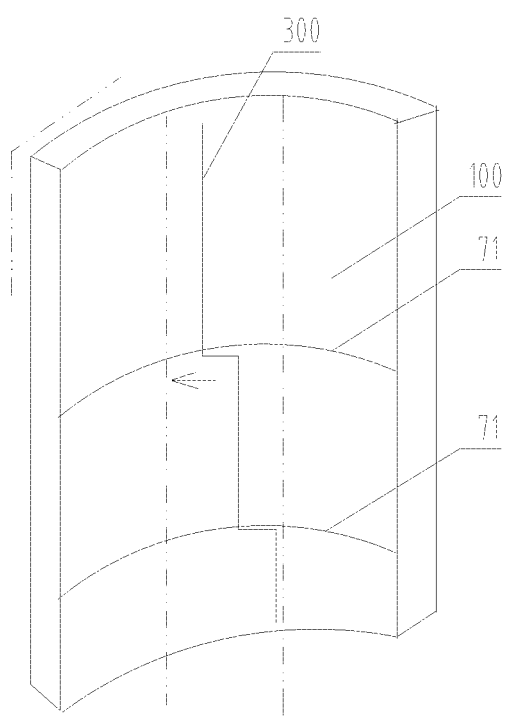

Reference is further made to FIGS. 15-1 to 15-4. FIG. 15-1 is a schematic view showing a first inclined arrangement of the power transmission conductor according to the embodiment of the present application. FIG. 15-2 is a schematic view showing a second inclined arrangement of the power transmission conductor according to the embodiment of the present application. FIG. 15-3 is a schematic view showing a third inclined arrangement of the power transmission conductor according to the embodiment of the present application. FIG. 15-4 is a schematic view showing a fourth inclined arrangement of the power transmission conductor according to the embodiment of the present application.

It may be known from the foregoing that, for the tower 1, the parameters of the airflow change from bottom to top, and the relatively low temperature areas of the tower wall 100 at different heights may be deflected from one another in the circumferential direction, generating inclination. FIGS. 15-1 to 15-4 show several inclined arrangements of the power transmission conductor 300, in which the power transmission conductor 300 may be completely inclined in a straight line or the power transmission conductor 300 may be inclined in several vertical segments connected via transition segments. In this way, the power transmission conductor 300 is directly arranged according to the variation law of the outside temperature, and the drive device driving the power transmission conductor 300 to move just moves synchronously. That is, according to the variation law of the relatively low temperature area, as long as the relatively low temperature area at a certain height is known, the entire power transmission conductor 300 inclined according to the law may be moved without requiring to know multiple relatively low temperature areas and further without requiring to segmentally control the relatively low temperature areas at different heights, which makes the movement control easier.

The inclined arrangement may further achieve another object, namely the power transmission and dissipating the heat generated by the conductor. According to the principle of rising of the hot airflow, the heat of a lower part may wrap an upper part. The inclined arrangement allows the heat of the lower part to avoid the upper part when rising, thus adverse influence on heat dissipation is reduced, and the area of an inner wall of the tower wall 100 close to or in contact with the power transmission conductor 300 may be utilized more fully, thus the heat exchange area is increased, thereby improving the heat dissipation efficiency.

Figure 16:
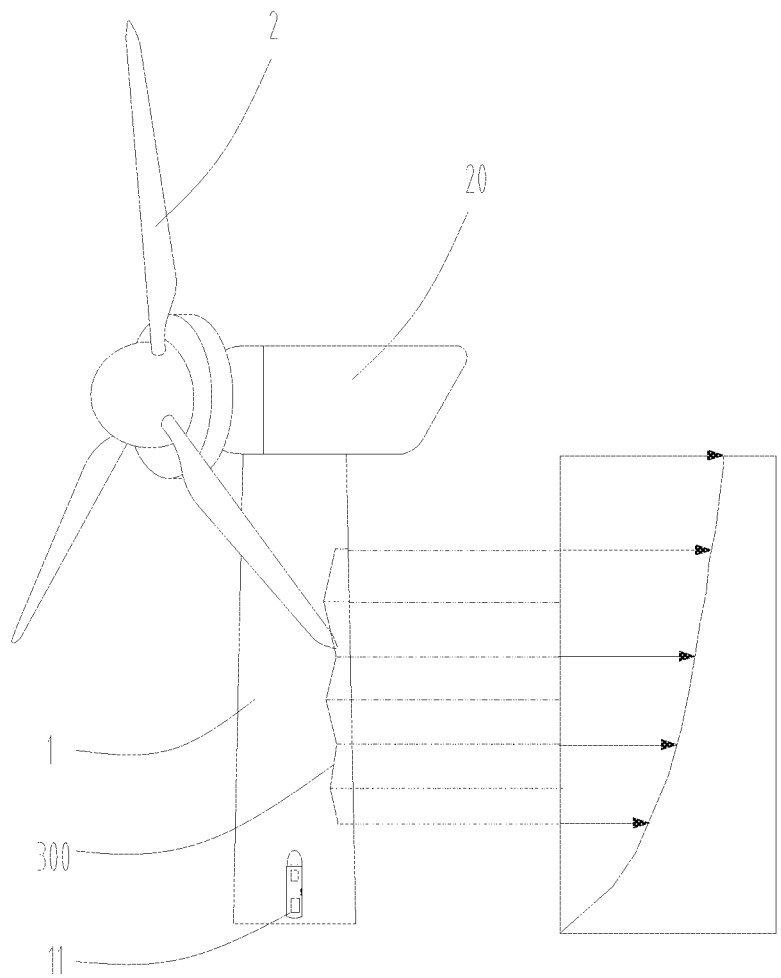
FIG. 16 is a schematic view showing the structure of the power transmission conductor which is provided inside the tower in a manner that the power transmission conductor is bent back and forth.

Reference is made to FIG. 16, which is a schematic view showing the structure of the power transmission conductor which is provided inside the tower in a manner that the power transmission conductor is bent back and forth.

In addition to the above inclined arrangement, the power transmission conductor 300 may also be provided to be bent back and forth. Specifically, the power transmission conductor 300 may be bent back and forth on a projection plane of the inner wall of the tower wall 100 and/or on a projection plane of a radial vertical surface of the tower wall 100. FIG. 16 shows the power transmission conductor 300 bent back and forth on the projection plane of the radial vertical surface of the tower wall 100. Bending back and forth is based on the same principle as the inclined arrangement described above, which is for reducing poor heat dissipation due to the rising of the hot airflow and for increasing the heat exchange area (the width or a circumferential radian of the comprehensive hot airflow may be twice of a previous one and above).

Figure 17:
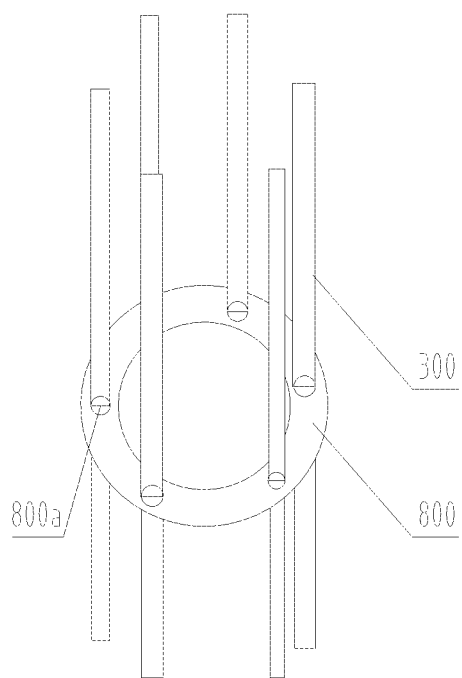
FIG. 17 is a schematic view showing the structure of the power transmission conductor located in a fixture according to an embodiment of the present application.

As shown in FIG. 17, FIG. 17 is a schematic view showing the structure of the power transmission conductor located in a fixture according to the embodiment of the present application. Multiple power transmission conductors are generally arranged. A fixture 800 is plate shaped and provided with multiple through holes 800a through which the power transmission conductors pass. After the multiple power transmission conductors pass through the fixture 800, the relative positions of the multiple power transmission conductors 300 are constant, and the multiple power transmission conductors 300 are hard to swing and twist and are isolated from each other, thus the safety degree may be improved. A plurality of fixtures 800 may be provided to segmentally clamp the power transmission conductors 300 tightly and to isolate the power transmission conductors 300 from one another. In addition, whether the power transmission conductors 300 are bent back and forth or connected to a drive device and a traction cable, the power transmission conductors 300 may be indirectly connected to the drive device and the traction cable by the fixtures 800.

A coating may be coated to the surface of the shady side, the coating is embodied as an anti-corrosion coating with a low reflectivity and a high absorptivity, to increase the cooling rate to the hot airflow and the absorptivity to the infrared radiation emitted by the power transmission conductors 300.

It is clear herein that, the issue of heat dissipation caused by rising of the hot airflow is substantially addressed by the dynamic heat dissipation system according to the present application. For a conventional power transmission conductor 300, the issue caused by the rising of the hot airflow is conspicuous. During the movement of the power transmission conductors 300, the rising hot airflow is left directly at an original position and does not rise continuously without wrapping outer surfaces of upper portions of the power transmission conductors 300, which breaks an original flow field and a flow trace of natural convection at a periphery of the power transmission conductor 300 which is originally in a stationary state, thereby constructing a new type of heat dissipation and cooling structure self-adapted to the solar radiation and the wind power for the enclosure in motion.

Accordingly, the solution of the present application not only relies on obtaining a colder area for heat dissipation, but also overcomes the issue which is caused by rising and wrapping of the hot airflow when heat dissipation is carried out in a stationary state, thus the heat dissipation efficiency may be greatly improved. For the power transmission conductor 300, after the heat dissipation effect is improved greatly, the power transmission capacity may be improved and the system security and reliability of a power transmission device may be improved, which is important to the wind power generator set.

In the above embodiment of the method for moving the heat source, the power transmission conductor 300 is mainly described and is moved along the arc-shaped track 71 of the inner wall of the tower wall 100. It should be understood that, based on the idea of the present application, other types of heat sources may also be moved, for example, be rotated on the rotating plate 52 along with the rotating plate 52 as described above. Other methods for moving the heat source are also provided by the present application.

For example, for the heat source such as an electrical control cabinet and a transformer, the transformer sometimes weighs a few of tons. In this case, a base bracket may be provided inside the tower 1 as the enclosure to support such an electrical device 900 (shown in FIG. 3-2) reliably. In fact, in addition to the heat generation device, other large devices may also be placed on the base bracket, to avoid affecting the stability of the enclosure. The base bracket may be supported at the bottom of the enclosure or directly supported at the base of the enclosure (e.g. a foundation), and there is a distance between the base bracket and the inner wall of the enclosure. In this way, the dynamic interaction between the base bracket and the enclosure is decoupled, thus the effect that a heavy heat source may have on the enclosure as the heavy heat source moves may be suppressed, and the deformation and vibration (the tower 1 may vibrate under the wind power) of the enclosure itself may not affect the base bracket and the movement of the heat source on the base bracket, and the installation is more reliable.

Figure 18:
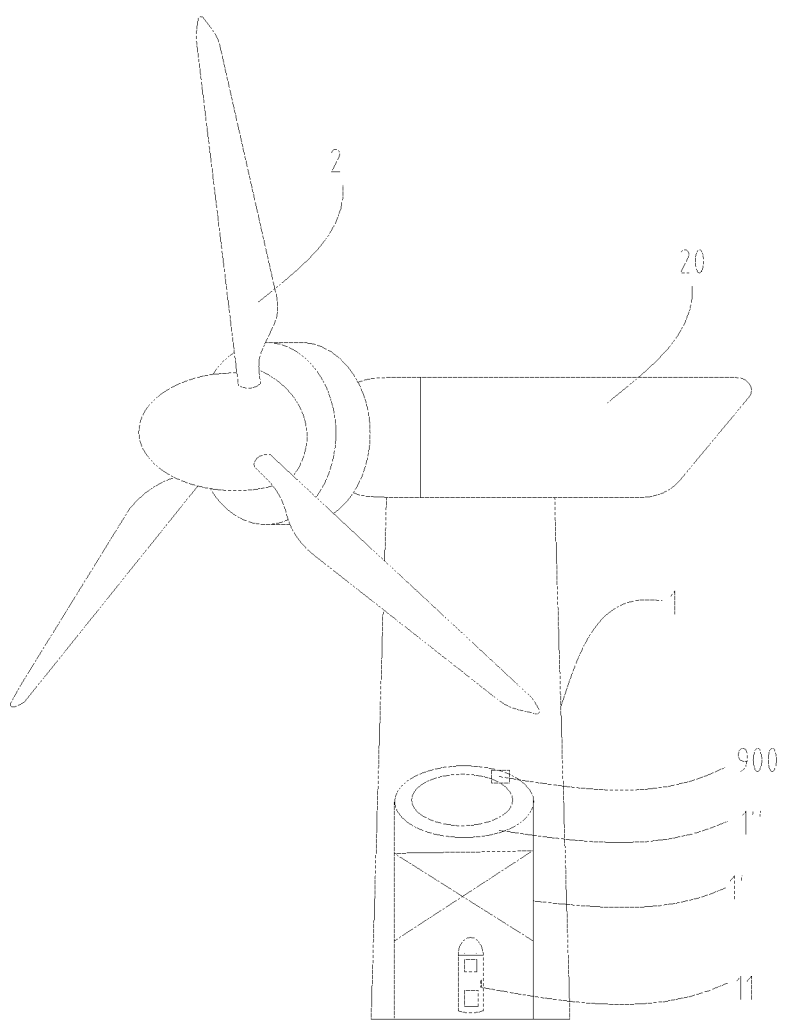
FIG. 18 is a schematic view showing the structure of a lattice tower structure provided inside the tower.

The base bracket may specifically be a lattice tower structure 1'. Reference is made to FIG. 18, which is a schematic view showing the structure of the lattice tower structure provided inside the tower.

The lattice tower structure 1' may be, for example, a steel tower of a steel-frame structure, and may have a height of a dozen or so meters. The lattice tower structure 1' has a simple and reliable structure, and is also convenient to be electrically connected to the outside. A track may be provided on the lattice tower structure for moving the heat source for example the electrical device 900 shown in FIG. 18, of course, the heat source may also be the heat source of other types. A top end of the lattice tower structure 1' may be provided with a base platform 1" for bearing the heat source. In addition to the electrical control cabinet and the transformer, a power transmission conductor connected to the transformer may also be driven to move, and the power transmission conductor may be another power transmission conductor other than the power transmission conductor 300 hung on the nacelle 20 mentioned above.

In the above embodiment, the power transmission conductor 300 is originally in a hung state and easy to rotate by 360 degrees. The heat source of other types may also be moved and is not necessarily required to be capable of rotating by 360 degrees according to the actual working state, for example, the heat source may move in a small angular range, such as a range of 45 degrees to 60 degrees, thus more types of heat sources inside the enclosure may be driven to move. The electrical device 900, such as the electrical cabinet and the transformer, may be moved in operation due to resilient connection to the outside.

Apparently, when the base bracket is provided, the track as described in the above embodiment may be provided on the base bracket, and the drive device is moved by cooperation between the rack and the gear, thus the heat source is further driven to move.

The above described embodiments are only preferred embodiments of the present application, and it should be noted that for the person skilled in the art, several improvements and modifications can be made without departing from the principle of the present application, and these improvements and modifications should also be deemed to fall into the scope of protection of the present application.

The invention claimed is:

1. A dynamic heat dissipation method for a heat source inside an enclosure, comprising:
    acquiring a relatively low temperature area of the enclosure; and
    driving the heat source to move to the relatively low temperature area.

2. The dynamic heat dissipation method for the heat source inside the enclosure according to claim 1, wherein the step of acquiring the relatively low temperature area comprises:
    acquiring a position of surrounding flow separation around an outer surface of the enclosure in contact with an upward incoming flow according to parameters of airflow outside the enclosure, and taking the position as the relatively low temperature area; or
    acquiring the relatively low temperature area according to a position of the shady side of the enclosure corresponding to an irradiation direction of solar radiation; or
    selecting a position between a position of surrounding flow separation at the shady side of the outer surface of the enclosure and a position of the shady side of the enclosure corresponding to the irradiation direction of the solar radiation as the relatively low temperature area.

3. The dynamic heat dissipation method for the heat source inside the enclosure according to claim 2, wherein the position of the shady side corresponding to the irradiation direction of the solar radiation is a position which is deflected by a predetermined angle toward a sunset direction with respect to a position of the shady side right corresponding to the irradiation direction of the solar radiation.

4. The dynamic heat dissipation method for the heat source inside the enclosure according to claim 2, wherein a temperature of an inner wall and a temperature of an outer wall at a sunlit side of the enclosure are detected to obtain a delay time that it takes the solar radiation to pass from the outer wall to the inner wall, and the heat source is driven, after the delay time elapses, to move to a relatively low temperature area corresponding to a current solar time.

5. The dynamic heat dissipation method for the heat source inside the enclosure according to claim 2, wherein a middle position between the position of the surrounding flow separation at the shady side and the position of the shady side of the enclosure corresponding to the irradiation direction of the solar radiation is selected as the relatively low temperature area.

6. The dynamic heat dissipation method for the heat source inside the enclosure according to claim 2, wherein a temperature of the outer surface of the enclosure is detected to obtain an actual relatively low temperature area of the outer surface of the enclosure, and the temperature of the actual relatively low temperature area is compared with a temperature of a surface at the position of the surrounding flow separation at the shady side, and a temperature of a surface at the position of the shady side of the enclosure corresponding to the irradiation direction of the solar radiation, to obtain a relationship between an actual lowest temperature position and the position of the surrounding flow separation at the shady side and the position of the shady side of the enclosure corresponding to the irradiation direction of the solar radiation.

7. The dynamic heat dissipation method for the heat source inside the enclosure according to claim 2, wherein when it is overcast or at night, the position of the surrounding flow separation is taken as the relatively low temperature area.

8. The dynamic heat dissipation method for the heat source inside the enclosure according to claim 2, wherein a temperature of the outer surface of the enclosure is detected, and the position of the surrounding flow separation at the shady side is taken as the relatively low temperature area when a difference between a temperature of a position of the shady side of the enclosure right corresponding to the irradiation direction of the solar radiation and a temperature of a sunlit side position irradiated by the solar radiation is not greater than a predetermined value.

9. The dynamic heat dissipation method for the heat source inside the enclosure according to claim 1, wherein when a predetermined time after sunset has elapsed, the heat source is driven to return to an inner side position of the enclosure at a shady side corresponding to noon.

10. The dynamic heat dissipation method for the heat source inside the enclosure according to claim 1, wherein a temperature of an outer wall and/or a temperature of an inner wall of the enclosure are/is detected to obtain the actual relatively low temperature area on a surface of the enclosure.

11. The dynamic heat dissipation method for the heat source inside the enclosure according to claim 10, wherein a temperature of the outer wall and/or a temperature of the inner wall in a height direction of the enclosure is segmentally detected to segmentally obtain corresponding relatively low temperature areas.

12. The dynamic heat dissipation method for the heat source inside the enclosure according to claim 1, wherein the heat source comprises an electrical control cabinet, a transformer and/or a power transmission conductor provided inside the enclosure.

13. The dynamic heat dissipation method for the heat source inside the enclosure according to claim 12, wherein the heat source is driven in real time to allow the heat source to be located in the relatively low temperature area in real time; or
a cycle is set, and after the cycle elapses, the heat source is driven to be located in a corresponding relatively low temperature area.

14. The dynamic heat dissipation method for the heat source inside the enclosure according to claim 12, wherein the power transmission conductor is driven to move to the relatively low temperature area when at least one of the following conditions is met:
a grid-side switch of a grid-connected transformer connected to the power transmission conductor is in a closed state with power output; and
a difference between a temperature of the power transmission conductor and a temperature of an outer wall or an inner wall of the enclosure is greater than a predetermined temperature difference.

15. The dynamic heat dissipation method for the heat source inside the enclosure according to claim 12, wherein a temperature of a surface of the power transmission conductor is detected, and after the power transmission conductor is moved to the relatively low temperature area, if a decrease in the temperature of the surface of the power transmission conductor is not greater than a predetermined profit value, driving of the power transmission conductor to move is stopped.

16. The dynamic heat dissipation method for the heat source inside the enclosure according to claim 15, wherein a surface of the power transmission conductor is divided into a plurality of areas according to magnitudes of the temperature, with higher temperature areas corresponding to lower predetermined profit values.

17. A dynamic heat dissipation system inside an enclosure, comprising:
a drive device configured to drive a heat source inside the enclosure to move; and
a control system which is configured to acquire a relatively low temperature area of the enclosure and control the drive device to drive the heat source to move to the relatively low temperature area.

18. The dynamic heat dissipation system inside the enclosure according to claim 17, wherein the control system comprises a parameter acquisition device, the parameter acquisition device acquires parameters of the airflow outside the enclosure, and the control system further includes a controller;
the controller acquires a position of surrounding flow separation around an outer surface of the enclosure in contact with upward incoming flow according to the parameters of the airflow outside the enclosure and takes the position as the relatively low temperature area; or
the controller acquires a position of the shady side of the enclosure corresponding to an irradiation direction of solar radiation and takes the position of the shady side as the relatively low temperature area; or
the controller selects a position, between a position of the surrounding flow separation at a shady side of the outer surface of the enclosure and a position of the shady side of the enclosure corresponding to an irradiation direction of solar radiation, as the relatively low temperature area.

19. The dynamic heat dissipation system inside the enclosure according to claim 17, wherein the heat source comprises an electrical control cabinet, a transformer and/or a power transmission conductor which are provided inside the enclosure.

20. The dynamic heat dissipation system inside the enclosure according to claim 19, wherein a bearing component is provided inside the enclosure, the heat source is placed on the bearing component, and the drive device drives the bearing component to move for driving the heat source to move to the relatively low temperature area.

21. The dynamic heat dissipation system inside the enclosure according to claim 20, wherein the bearing component comprises a carrying bracket, a segment of the power transmission conductor is carried on a bearing surface of the carrying bracket, the bearing surface is arranged in an arc shape;
the electric power transmission conductor above the carrying bracket forms an arc-shaped hanging segment in front of the carrying bracket and the electric power transmission conductor below the carrying bracket hangs down behind the carrying bracket; and
the drive device comprises a first drive unit configured to drive the carrying bracket to rotate so as to drive the power transmission conductor carried on the bearing surface and below the bearing surface to move to a relatively low temperature area of the enclosure.

22. The dynamic heat dissipation system in the enclosure according to claim 21, wherein the drive device further comprises a second drive unit configured to drive the power transmission conductor below the carrying bracket to rotate synchronously with the carrying bracket.

23. The dynamic heat dissipation system in the enclosure according to claim 21, wherein a platform is provided inside the enclosure, the platform is provided with a rotating plate rotationally connected to the platform, the carrying bracket is provided on the rotating plate, and the first drive unit is configured to drive the rotating plate to rotate.

24. The dynamic heat dissipation system in the enclosure according to claim 23, wherein the rotating plate is fan-shaped, a small arc-shaped end of the rotating plate is provided with a rotating shaft mounted on the platform, and the rotating plate rotates about the rotating shaft.

25. The dynamic heat dissipation system inside the enclosure according to claim 20, wherein the bearing component comprises a carrying bracket, a segment of the power transmission conductor is carried on a bearing surface of the carrying bracket, the bearing surface is arranged in an arc shape;

the electric power transmission conductor above the carrying bracket forms an arc-shaped hanging segment in front of the carrying bracket and a segment of the electric power transmission conductor below the carrying bracket hangs down behind the carrying bracket; and the power transmission conductor is positioned on the carrying bracket, and the drive device drives only the power transmission conductor below the bearing surface to move to the relatively low temperature area.

26. The dynamic heat dissipation system inside the enclosure according to claim 19, further comprising a traction cable which moves along with the power transmission conductor, wherein the power transmission conductor is segmentally secured to the traction cable, and the traction cable is connected to a platform inside the enclosure.

27. The dynamic heat dissipation system inside the enclosure according to claim 19, wherein the power transmission conductor is bent back and forth on a projection plane of an inner wall of the enclosure and/or a projection plane of a radial vertical surface of the enclosure.

28. The dynamic heat dissipation system inside the enclosure according to claim 17, wherein a base bracket is provided inside the enclosure, and the base bracket is supported at a bottom of the enclosure or supported at a foundation of the enclosure, the corresponding heat source is driven to move along the base bracket; and there is a spacing between the base bracket and an inner wall of the enclosure.

29. An enclosure having the dynamic heat dissipation system according to claim 17, wherein the enclosure comprises a tower of a wind generator set or a building exterior wall of a television tower, or a housing of a water surface vehicle or an aviation vehicle;

the heat source located inside the water surface vehicle or the aviation vehicle comprises a fuel tank, and the drive device drives liquid fuel inside the fuel tank to move to the relatively low temperature area.

* * * * *